(12) United States Patent
Wada

(10) Patent No.: US 12,738,869 B2
(45) Date of Patent: Sep. 15, 2026

(54) MOTOR DRIVE CONTROL DEVICE, MOTOR UNIT, AND MOTOR DRIVE CONTROL METHOD

(71) Applicant: MINEBEA MITSUMI Inc., Nagano (JP)

(72) Inventor: Naoyuki Wada, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 192 days.

(21) Appl. No.: 18/712,823

(22) PCT Filed: Oct. 27, 2022

(86) PCT No.: PCT/JP2022/040076
§ 371 (c)(1),
(2) Date: May 23, 2024

(87) PCT Pub. No.: WO2023/100549
PCT Pub. Date: Jun. 8, 2023

(65) Prior Publication Data
US 2025/0023496 A1 Jan. 16, 2025

(30) Foreign Application Priority Data
Dec. 3, 2021 (JP) ................................ 2021-196737

(51) Int. Cl.
*H02P 8/38* (2006.01)

(52) U.S. Cl.
CPC .................................... *H02P 8/38* (2013.01)

(58) Field of Classification Search
CPC .... H02P 8/38; H02P 6/182; H02P 6/21; H02P 8/10; H02P 8/12; H02P 8/14; H02P 8/04; H02P 6/157
See application file for complete search history.

(56) References Cited

U.S. PATENT DOCUMENTS 4,103,216 A * 7/1978 Hayes ...................... H02P 8/20 318/685
2019/0190415 A1 6/2019 Hijikata
2019/0379309 A1* 12/2019 Karasawa ................ H02P 1/18

FOREIGN PATENT DOCUMENTS

JP 2005-278320 A 10/2005
JP 2018-038213 A 3/2018

OTHER PUBLICATIONS

International Search Report for corresponding International Application No. PCT/JP2022/040076 mailed Jan. 17, 2023.

(Continued)

*Primary Examiner* — Bickey Dhakal
(74) *Attorney, Agent, or Firm* — Chrisman Gallo Tochtrop LLC

(57) ABSTRACT

To increase the stability of an operation when the driving of a stepping motor is started. A motor drive control device includes a control unit configured to generate a control signal (Sd) for controlling driving of a two-phase stepping motor, and a drive unit configured to drive coils of two phases of the two-phase stepping motor based on the control signal (Sd). The control unit has, as control modes, a first commutation control mode for commutating the coils according to a target energization time based on a preset commutation condition, and a second commutation control mode for commutating the coils based on a detection result of a zero crossing point of a back electromotive voltage of the coils, and the control unit generates the control signal (Sd) in the first commutation control mode at the start of activation of the two-phase stepping motor, and generates the control signal (Sd) in the second commutation control mode when the detection result of the zero crossing point satisfies a predetermined condition.

11 Claims, 18 Drawing Sheets

(56) References Cited

OTHER PUBLICATIONS

Written Opinion for corresponding International Application No. PCT/JP2022/040076 dated Jan. 17, 2023 and English translation.

* cited by examiner

| SPEED AT MOST RECENT DRIVE STOP | |
|---|---|
| SPEED R < Rth | SPEED R ≥ Rth |
| HIGH LOAD | LOW LOAD |

FIG. 14A

| TARGET OBJECT TO BE DRIVEN IS ROTARY SYSTEM | | |
|---|---|---|
| DRIVING DIRECTION AT START OF DRIVING | SPEED AT MOST RECENT DRIVE STOP | |
| | SPEED R < Rth | SPEED R ≥ Rth |
| SAME DIRECTION AS DIRECTION AT MOST RECENT DRIVE STOP | HIGH LOAD | LOW LOAD |
| DIRECTION OPPOSITE TO DIRECTION AT MOST RECENT DRIVE STOP | LOW LOAD | HIGH LOAD |

FIG. 14B

| TARGET OBJECT TO BE DRIVEN IS UNKNOWN | | |
|---|---|---|
| DRIVING DIRECTION AT START OF DRIVING | SPEED AT MOST RECENT DRIVE STOP | |
| | SPEED R < Rth | SPEED R ≥ Rth |
| SAME DIRECTION AS DIRECTION AT MOST RECENT DRIVE STOP | HIGH LOAD | LOW LOAD |
| DIRECTION OPPOSITE TO DIRECTION AT MOST RECENT DRIVE STOP | (UNKNOWN) | (UNKNOWN) |

FIG. 14C

MOTOR DRIVE CONTROL DEVICE, MOTOR UNIT, AND MOTOR DRIVE CONTROL METHOD

CROSS-REFERENCE TO RELATED APPLICATIONS

This application is a national stage entry of International Application No. PCT/JP2022/040076 filed on Oct. 27, 2022, which claims the benefit of priority to Japanese Application No. JP2021-196737, filed Dec. 3, 2021, the entire disclosures of which are hereby incorporated herein by reference.

TECHNICAL FIELD

The present invention relates to a motor drive control device, a motor unit, and a motor drive control method, and for example, relates to a motor drive control device for driving a stepping motor.

BACKGROUND ART

As a stepping motor, a two-phase stepping motor having two phases is known.

As drive systems of the two-phase stepping motors, a one-phase excitation system, a two-phase excitation system, and a one-two-phase excitation system are known.

For example, Patent Document 1 discloses a position sensorless type motor drive control technique of, when a two-phase stepping motor is driven by a one-phase excitation system, detecting a point (zero crossing point) and commutating the stepping motor based on the detected zero crossing point of a back electromotive voltage of a coil of the stepping motor, the back electromotive voltage being 0 V at the zero crossing point.

CITATION LIST

Patent Literature

Patent Document 1: JP 2018-38213 A

SUMMARY OF INVENTION

Technical Problem

In general, when the driving of the stepping motor is started, no back electromotive voltage is generated. When the stepping motor is operated at a low speed, the back electromotive voltage is less. Therefore, in the method of detecting the zero crossing point of a back electromotive voltage and commutating a stepping motor in a one-phase excitation system or a one-two-phase excitation system in the related art, for example, when the driving of the stepping motor is started, the zero crossing point of the back electromotive voltage may not be detected and the stepping motor may not be appropriately driven. In particular, when a load on the stepping motor is great, the stepping motor may step out with a high possibility.

The present invention has been made in view of the above-described problem, and an object of the present invention is to increase the stability of an operation when the driving of a stepping motor is started.

Solution to Problem

A motor drive control device according to a typical embodiment of the present invention includes: a control unit configured to generate a control signal for controlling driving of a two-phase stepping motor; and a drive unit configured to drive coils of two phases of the two-phase stepping motor based on the control signal, wherein the control unit has, as control modes, a first commutation control mode for commutating the coils according to a target energization time based on a preset commutation condition, and a second commutation control mode for commutating the coils based on a detection result of a zero crossing point of a back electromotive voltage of the coils, and the control unit generates the control signal in the first commutation control mode at start of activation of the two-phase stepping motor, and generates the control signal in the second commutation control mode when the detection result of the zero crossing point satisfies a predetermined condition.

Advantageous Effects of Invention

A motor drive control device according to the present invention can increase the stability of an operation when the driving of a stepping motor is started.

BRIEF DESCRIPTION OF DRAWINGS

FIG. 14A is a diagram illustrating an example of a load determination table.

FIG. 14B is a diagram illustrating an example of a load determination table.

FIG. 14C is a diagram illustrating an example of a load determination table.

DESCRIPTION OF EMBODIMENTS

1. Overview of Embodiments

Figure 1:
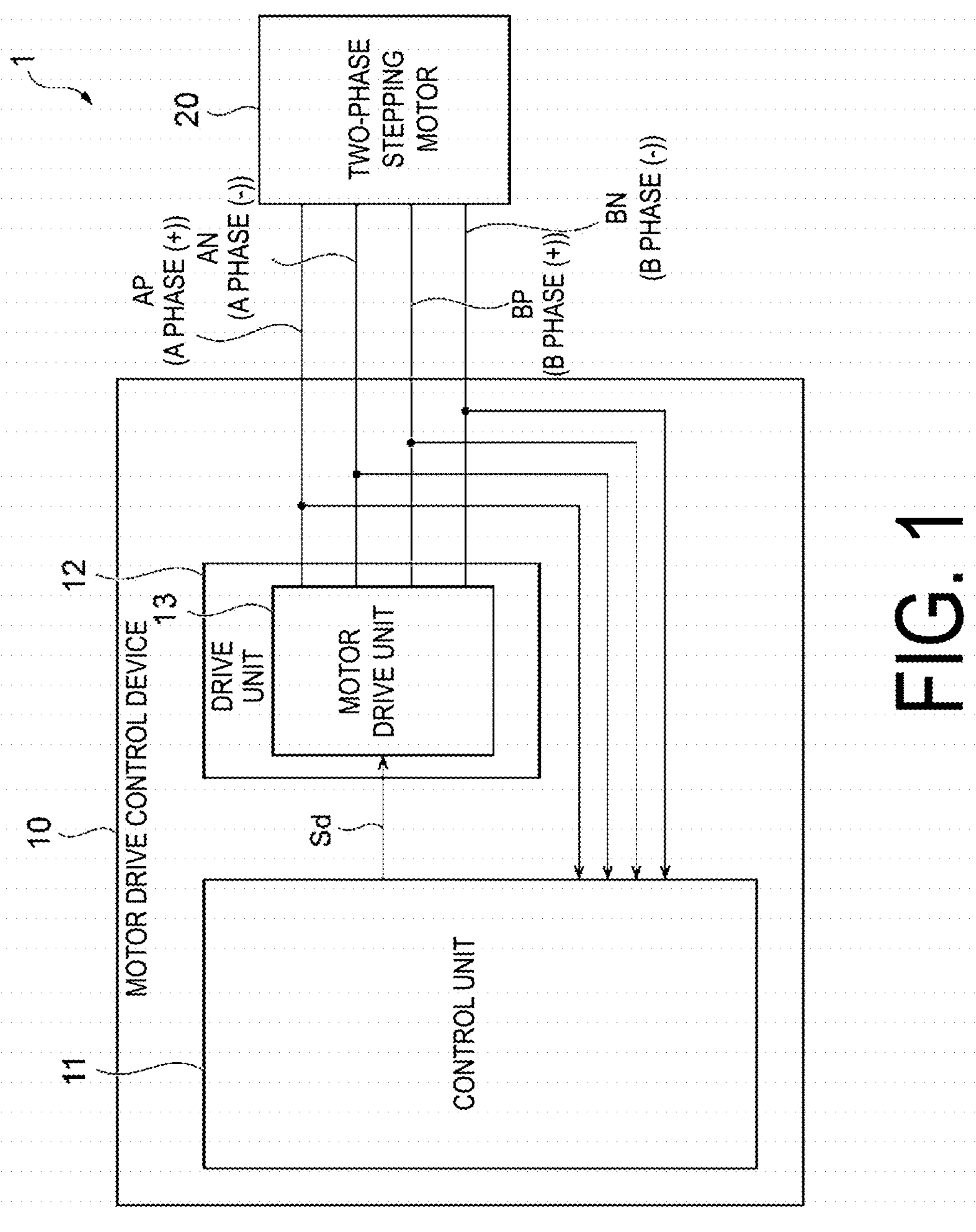
FIG. 1 is a block diagram illustrating a configuration of a motor unit according to a first embodiment.

First, an overview of typical embodiments of the invention disclosed herein will be described. In the following description, by way of example, reference numerals on the drawings corresponding to the components of the invention are indicated in parentheses.

[1] A motor drive control device (10, 10A) according to a typical embodiment of the present invention includes: a control unit (11, 11A) configured to generate a control signal (Sd) for controlling driving of a two-phase stepping motor (20); and a drive unit (12) configured to drive coils of two phases of the two-phase stepping motor based on the control signal, wherein the control unit has, as control modes, a first commutation control mode for commutating the coils according to a target energization time based on a preset commutation condition, and a second commutation control mode for commutating the coils based on a detection result of a zero crossing point of a back electromotive voltage of the coils, and the control unit generates the control signal in the first commutation control mode at the start of activation of the two-phase stepping motor, and generates the control signal in the second commutation control mode when the detection result of the zero crossing point satisfies a predetermined condition.

[2] The motor drive control device according to [1], wherein a speed of the two phase stepping motor and an energization angle (θ) indicating a magnitude of an electrical angle for energizing one of the coils of the two phases continuously in one direction may be set as the commutation condition, and in the first commutation control mode, the control unit may determine the target energization time based on the speed and the energization angle.

[3] The motor drive control device according to [2], wherein, in the first commutation control mode, the speed may increase over time.

[4] The motor drive control device according to [2] or [3], wherein, in the first commutation control mode, the energization angle may be reduced to a predetermined value over time.

[5] The motor drive control device according to any one of [2] to [4], wherein the control unit may store information on a speed characteristic (121) indicating a correspondence relationship between a driving amount and the speed of the two-phase stepping motor, and in the first commutation control mode, the control unit may determine the speed corresponding to the driving amount based on the speed characteristic.

[6] The motor drive control device (10A) according to any one of [2] to [4], wherein, in a case where starting commutation control of the two-phase stepping motor in the first commutation control mode, the control unit (11A) may determine a rate of change in the speed based on a magnitude of a load on the two-phase stepping motor when driving of the two-phase stepping motor is stopped most recently.

[7] The motor drive control device according to [6], wherein the control unit may store information on a plurality of speed characteristics (121_1 and 121_2) indicating a relationship between a driving amount and the speed of the two-phase stepping motor corresponding to the magnitude of the load on the two-phase stepping motor, the plurality of speed characteristics may be different from each other in the rate of change in the speed, and in the first commutation control mode, the control unit may select the speed characteristic with the rate of change less in the speed as the load on the two-phase stepping motor when the driving of the two-phase stepping motor has been stopped most recently is greater, and determines the speed based on the selected speed characteristic.

[8] The motor drive control device according to [6] or [7], wherein the control unit estimates the magnitude of the load based on information on at least one of the speed or a driving direction of the two-phase stepping motor when the driving of the two-phase stepping motor is stopped most recently.

[9] The motor drive control device according to [5] or [7], wherein the speed characteristic may include a first section (A) where the speed changes at a constant rate, a second section (B) subsequent to the first section where the speed changes at a higher rate than the first section, and a third section (C) where the speed changes at a lower rate than the second section subsequent to the second section.

[10] The motor drive control device according to any one of [1] to [9], wherein the predetermined condition may include a threshold value (125) related to the number of times of detection of the zero crossing point, and when the number of times of detection of the zero crossing point is equal to or greater than the threshold value, the control unit may switch the control mode from the first commutation control mode to the second commutation control mode.

[11] A motor unit (1) according to a typical embodiment of the present invention includes the motor drive control device (10) according to any one of [1] to [10], and the two-phase stepping motor (20).

[12] A motor drive control method for controlling driving of a two-phase stepping motor according to a typical embodiment of the present invention includes: a first step (S2) of commutating coils of two phases of the two-phase stepping motor according to a target energization time based on a preset commutation condition at start of activation of the two-phase stepping motor; a second step (S28) of determining whether a detection result of a zero crossing point of a back electromotive voltage of the coils satisfies a predetermined condition; and a third step (S3) of commutating the coils based on the detection result of the zero crossing point when the detection result of the zero crossing point satisfies the predetermined condition.

2. Specific Examples of Embodiments

Specific examples of embodiments of the present invention will be described below with reference to the drawings. In the following description, the same reference numerals are used for the common components in each embodiment, and the repeated descriptions are omitted.

First Embodiment

FIG. 1 is a block diagram illustrating a configuration of a motor unit according to a first embodiment.

As illustrated in FIG. 1, a motor unit 1 includes a two-phase stepping motor 20 and a motor drive control device 10 driving the two-phase stepping motor 20. For example, the motor unit 1 is applicable to various devices using, as a power source, a motor such as an actuator available for heating ventilation and air-conditioning (HVAC) serving as an air-conditioning unit for an on-board application.

Figure 2:
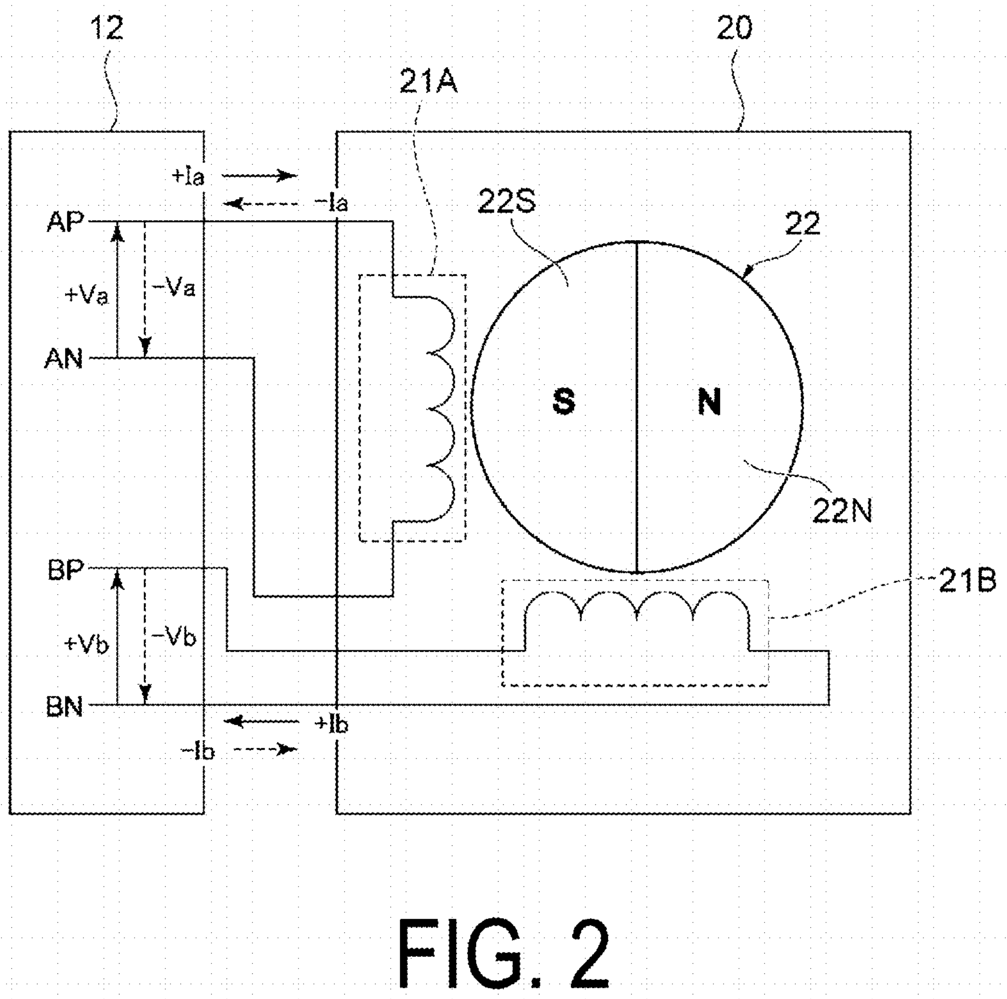
FIG. 2 is a diagram schematically illustrating a configuration of a two-phase stepping motor according to the first embodiment.

FIG. 2 is a diagram schematically illustrating a configuration of the two-phase stepping motor 20 according to the first embodiment.

The two-phase stepping motor 20 is, for example, a stepping motor including coils of two phases. As illustrated in FIG. 2, the two-phase stepping motor 20 includes an A-phase coil 21A, a B-phase coil 21B, a rotor 22, and a two-phase stator yoke (not illustrated).

Each of the coils 21A and 21B is a coil exciting the stator yoke (not illustrated). Each of the coils 21A and 21B is connected to a drive unit 12 to be described below. Currents (coil currents) with different phases flow into the respective coils 21A and 21B.

In the following description, when not being individually distinguished, the coils 21A and 21B may be simply denoted as a "coil 21".

The rotor 22 includes a permanent magnet subjected to multipolar magnetization along a circumferential direction such that an S pole 22S and an N pole 22N are alternately inverted. Note that in FIG. 2, a case of the rotor 22 with two poles is illustrated as an example.

The stator yoke is disposed around the rotor 22 in proximity to an outer circumferential part of the rotor 22. The phase of the coil current flowing through each of the coils 21A and 21B is periodically switched, so that the rotor 22 rotates. An output shaft (not illustrated) is connected to the rotor 22, and is driven by rotational force of the rotor 22.

The motor drive control device 10 is a device for driving the two-phase stepping motor 20. For example, the motor drive control device 10 controls energization states of the coils 21A and 21B of each of the phases of the two-phase stepping motor 20 based on a drive instruction, for example, from a host device (not illustrated) to control rotating and stopping of the two-phase stepping motor 20.

As illustrated in FIG. 1, the motor drive control device 10 includes a control unit 11 and a drive unit 12.

The drive unit 12 drives the two-phase stepping motor 20 by energizing the coils 21A and 21B of the two-phase stepping motor 20. The drive unit 12 includes a motor drive unit 13.

The motor drive unit 13 supplies drive power to the two-phase stepping motor 20 based on a control signal Sd generated by the control unit 11. As illustrated in FIG. 2, the motor drive unit 13 is connected to a terminal AP at a positive electrode side of the coil 21A, a terminal AN at a negative electrode side of the coil 21A, a terminal BP at a positive electrode side of the coil 21B, and a terminal BN at a negative electrode side of the coil 21B, and energizes the coils 21A and 21B by applying a voltage to each of the terminals AP, AN, BP, and BN.

The motor drive unit 13 includes, for example, an H-bridge circuit (not illustrated) including four switching elements (for example, transistors). The motor drive unit 13 commutates the coils 21A and 21B by selectively turning on and off each switching element constituting the H-bridge circuit, for example.

As illustrated in FIG. 2, when a current of +Ia flows into the A-phase coil 21A, the motor drive unit 13 applies a voltage of "+Va" between both of the terminal AN and the terminal AP of the coil 21A, for example. On the other hand, when a current of −Ia flows into the A-phase coil 21A, the motor drive unit 13 applies a voltage of "−Va" between both of the terminal AN and the terminal AP of the coil 21A, for example. Similarly, when a current of +Ib flows into the B-phase coil 21B, the motor drive unit 13 applies a voltage of "+Vb" between both of the terminal BN and the terminal BP of the coil 21B, and when a current of −Ib flows into the B-phase coil 21B, the motor drive unit 13 applies a voltage of "−Vb" between both of the terminal BN and the terminal BP of the coil 21B, for example.

The motor drive unit 13 switches the energization state (energization direction) of each of the coils 21A and 21B by switching a voltage to be applied between the terminals of each of the coils 21A and 21B as described above, based on the control signal Sd supplied from the control unit 11 to control the driving of the two-phase stepping motor 20, and commutates each of the coils 21A and 21B.

The control unit 11 is a functional unit for performing centralized control of the motor drive control device 10. The control unit 11 is a program processing device (for example, a micro controller) having a configuration of including, for example, a processor such as a CPU, various types of storage devices such as a RAM and a ROM, and peripheral circuits such as a timer (counter), an A/D conversion circuit, a D/A conversion circuit, and an input/output I/F circuit connected to one another via a bus. In the present embodiment, the control unit 11 is packaged as an integrated circuit (IC), but is not limited to such a packaged unit.

The control unit 11 has, as control modes for commutating the coils 21A and 21B of the two-phase stepping motor 20, a first commutation control mode for commutating the coils 21A and 21B according to a target energization time based on a preset commutation condition, and a second commutation control mode for commutating the coils 21A and 21B based on a detection result of a zero crossing point of a back electromotive voltage of the coils 21A and 21B.

In the first commutation control mode, the control unit 11 generates the control signal Sd to drive the two-phase stepping motor 20 by a two-phase excitation system or a one-two-phase excitation system. In the second commutation control mode, the control unit 11 generates the control signal Sd to drive the two-phase stepping motor 20 by the one-two-phase excitation system or a one-phase excitation system.

In the following description, as an example, the control unit 11 drives the two-phase stepping motor 20 by the one-two-phase excitation system in the first commutation control mode and the second commutation control mode.

As described above, when a load on the two-phase stepping motor is great at the start of driving of the two-phase stepping motor, that is, immediately after driving of the two-phase stepping motor being stopped is started, the excitation position of the coil is delayed with respect to the position of the rotor, and thus the zero crossing point of the back electromotive voltage may not be detected at an appropriate timing. When the zero crossing point of the back electromotive voltage is not detectable in the one-phase excitation system or the one-two-phase excitation system, the energization switching of the coils may not be appropriately performed, thereby increasing the possibility of the step-out of the two-phase stepping motor.

In this regard, in the motor drive control device 10 according to the present embodiment, immediately after the start of driving of the two-phase stepping motor 20, the control unit 11 sets the control mode to the first commutation control mode and commutates the coils 21A and 21B according to the target energization time based on the preset commutation condition regardless of the detection result of the zero crossing point of the back electromotive voltage, and then, when the detection result of the zero crossing point of the back electromotive voltage of the coils 21A and 21B satisfies a predetermined condition, the control unit 11 switches the control mode from the first commutation control mode to the second commutation control mode, and commutates the coils 21A and 21B based on the detection result of the zero crossing point of the back electromotive voltage of the coils 21A and 21B.

The above predetermined condition includes, for example, a threshold value related to the number of times of detection of the zero crossing point of the back electromotive voltage. For example, when the number of times of detection of the zero crossing point of the back electromotive voltage is equal to or greater than the threshold value, the control unit 11 switches the control mode from the first commutation control mode to the second commutation control mode.

In the control unit 11, as the commutation condition, a speed of the two-phase stepping motor 20 and an energization angle indicating the magnitude of an electrical angle for continuously energizing a coil of one phase of the two-phase coils in one direction are set. In the first commutation control mode, the control unit 11 determines the target energization time based on the set speed and energization angle, and performs energization switching of the coils 21A and 21B according to the target energization time.

The target energization time is a target value with the length of a continuation period of one energization pattern (energization state). For example, when the two-phase stepping motor 20 is driven by the one-two-phase excitation system in the first commutation control mode, the control unit 11 calculates a target energization time for one-phase excitation and a target energization time for two-phase excitation, and alternately switches between the one-phase excitation and the two-phase excitation according to the target energization times. Details of a method of calculating the target energization time will be described below.

The speed in the first commutation control mode is determined based on a preset speed characteristic.

Figure 3:
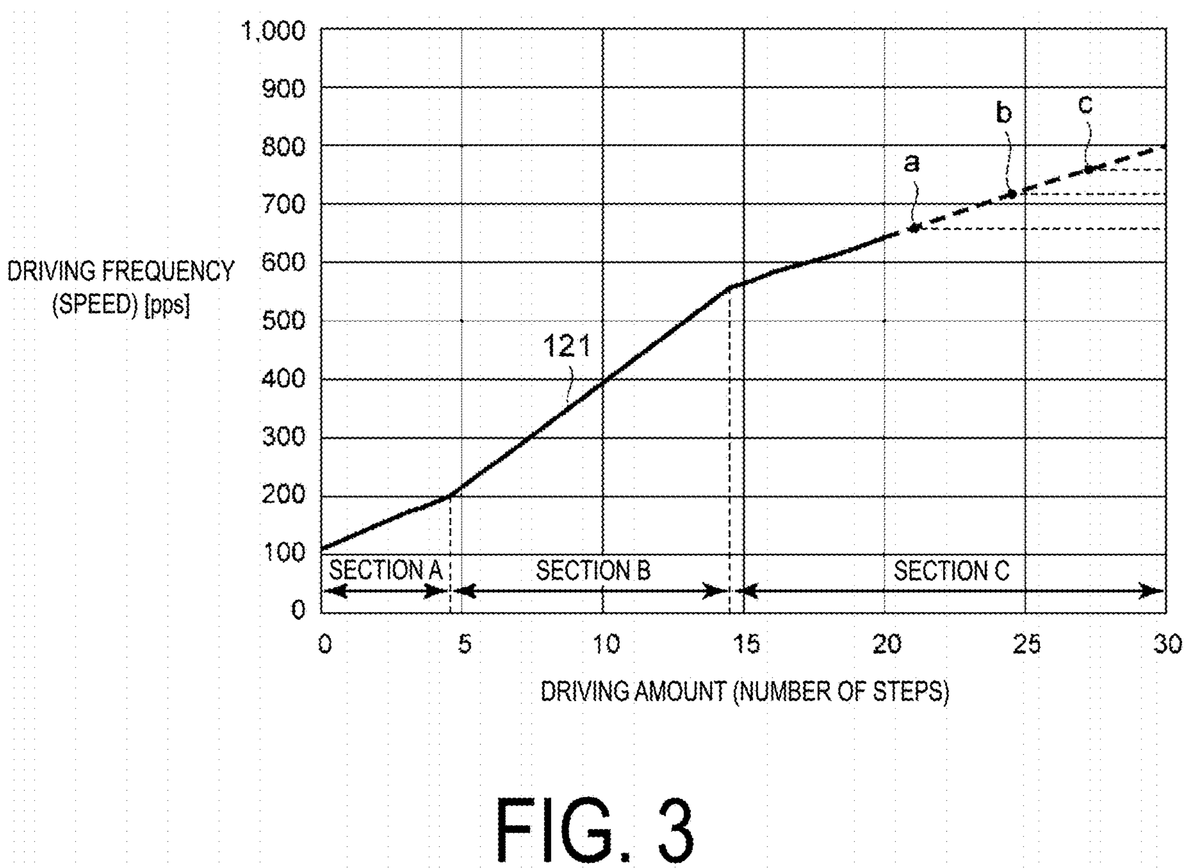
FIG. 3 is a diagram illustrating an example of a speed characteristic in a motor drive control device according to the first embodiment.

FIG. 3 is a diagram illustrating an example of a speed characteristic in the motor drive control device 10 according to the first embodiment.

In FIG. 3, a horizontal axis represents the driving amount of the two-phase stepping motor 20.

In the present embodiment, the unit driving amount of the two-phase stepping motor 20 is one step. For example, the one step corresponds to an electrical angle of 90°, and when the two-phase stepping motor 20 is driven by four steps, the electrical angle rotates by 360°.

In FIG. 3, a vertical axis represents the speed of the two-phase stepping motor 20.

The speed is a speed related to driving of the two-phase stepping motor 20. The speed is, for example, a speed for driving the coils 21A and 21B of the two-phase stepping motor, that is, a speed (commutation speed) for switching the excitation state (energization pattern) of the coils 21A and 21B. The speed may be the rotation speed of the rotor of the two-phase stepping motor 20. In FIG. 3, the vertical axis indicates a driving frequency [pps] in terms of one phase as the speed of the two-phase stepping motor 20.

In FIG. 3, reference numeral 121 represents a speed characteristic indicating a correspondence relationship between the driving amount and the speed of the two-phase stepping motor 20. In the present embodiment, the speed characteristic 121 is set such that the speed increases as the driving amount (the number of steps) of the two-phase stepping motor 20 increases. In other words, in the first commutation control mode, the speed increases over time.

For example, as illustrated in FIG. 3, the speed characteristic 121 includes a first section A where the speed changes at a constant rate, a second section B subsequent to the first section A where the speed changes at a higher rate than the first section A, and a third section C subsequent to the second section B where the speed changes at a lower rate than the second section B.

For example, the control unit 11 controls the commutation of the coils 21A and 21B while changing the speed (driving frequency) along the speed characteristic 121.

For example, since the step-out is likely to occur immediately after the start of activation of the two-phase stepping motor 20 as described above, the control unit 11 first gently increases the speed as shown in the first section A. Subsequently, when a speed region having a low possibility of occurrence of step-out is reached, the control unit 11 increases the rate of change in the speed compared to the first section A as shown in the second section B. When the zero crossing point of the back electromotive voltage reaches a detectable speed region, the control unit 11 reduces the rate of change in the speed again as shown in the third section C in order to more reliably detect the zero crossing point of the back electromotive voltage and avoid step-out. Subsequently, when the detection result of the zero crossing point of the back electromotive voltage satisfies the predetermined condition, the control mode is switched from the first commutation control mode to the second commutation control mode, and commutation control is performed based on the detection result of the zero crossing point of the back electromotive voltage.

As illustrated in FIG. 3, switching timings a, b, and c from the first commutation control mode to the second commutation control mode are changed depending on the load on the two-phase stepping motor 20. Although details will be described below, as the load increases, the switching timing from the first commutation control mode to the second commutation control mode becomes earlier. That is, as the load increases, the first commutation control mode is switched to the second commutation control mode at a lower speed.

Although FIG. 3 illustrates the speed characteristic 121 with a change in the speed in a polygonal line shape according to the driving amount, no such limitation is intended. For example, in the speed characteristic, the speed changes in a curve manner according to the driving amount.

The energization angle in the first commutation control mode is determined based on a preset energization angle characteristic.

A relationship between an energization angle and an excitation period in the two-phase stepping motor will be described below.

Figure 4:
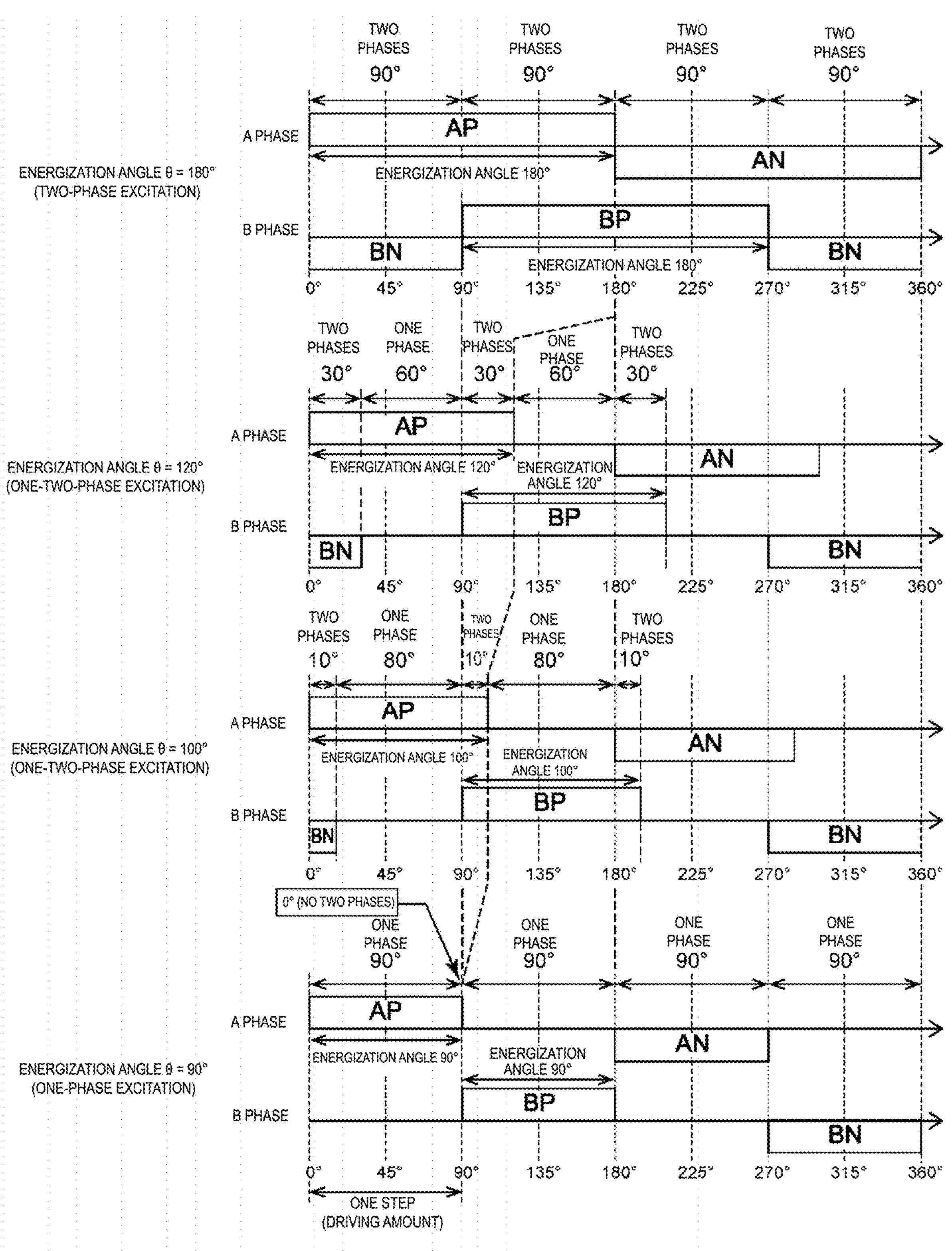
FIG. 4 is a diagram for explaining a relationship between an energization angle and an excitation period of a coil in the two-phase stepping motor.

FIG. 4 is a diagram for explaining a relationship between an energization angle and an excitation period of a coil in the two-phase stepping motor.

In FIG. 4, a horizontal axis represents an electrical angle. The first row from the top in FIG. 4 indicates respective excitation states of the A-phase and B-phase coils when an energization angle θ is 180°, the second row from the top in FIG. 4 indicates respective excitation states of the A-phase and B-phase coils when the energization angle θ is 120°, the third row from the top in FIG. 4 indicates respective excitation states of the A-phase and B-phase coils when the energization angle θ is 100°, and the fourth row from the top in FIG. 4 indicates respective excitation states of the A-phase and B-phase coils when the energization angle θ is 90°.

In general, the excitation system of the two-phase stepping motor is determined by the energization angle θ indicating the magnitude of an electrical angle for continuously energizing a coil of one phase of the two-phase coils in one direction.

As illustrated in FIG. 4, when the energization angle θ is set to 180°, the two-phase excitation system is used, so that the coils 21 of two phases out of the two-phase coils 21 in the two-phase stepping motor 20 are excited and the energization pattern is switched at every 90°.

As illustrated in FIG. 4, when the energization angle θ is set in the range of 90°<θ<180°, the one-two-phase excitation mode is used to alternately repeat one-phase excitation system of exciting the coil 21 of one phase out of the two-phase coils 21 in the two-phase stepping motor 20 and two-phase excitation of exciting the coils 21 of two phases out of the two-phase coils 21.

Furthermore, as illustrated in FIG. 4, when the energization angle θ is set to 90°, the one-phase excitation system is used, so that the coil 21 of one phase out of the two-phase coils 21 in the two-phase stepping motor 20 is alternately excited and the energization pattern is switched at every 90°.

In the one-two-phase excitation system, when the energization angle is 120°, the period of the one-phase excitation is 60° and the period of the two-phase excitation is 30°, and when the energization angle is 100°, the period of the one-phase excitation is 80° and the period of the two-phase excitation is 10°. That is, as the energization angle θ decreases, the longer the period of the one-phase excitation is, while the period of the two-phase excitation becomes shorter. As the period of the two-phase excitation is longer, the torque of the two-phase stepping motor 20 becomes greater, and no step-out is likely to occur.

In this regard, in the motor drive control device 10 according to the present embodiment, when the two-phase stepping motor 20 is driven by the one-two-phase excitation system in the first commutation control mode, the energization angle θ is set to a great value immediately after the activation of the two-phase stepping motor 20 to avoid step-out, and the energization angle θ is reduced to a value set in the second commutation control mode over time.

Figure 5A:
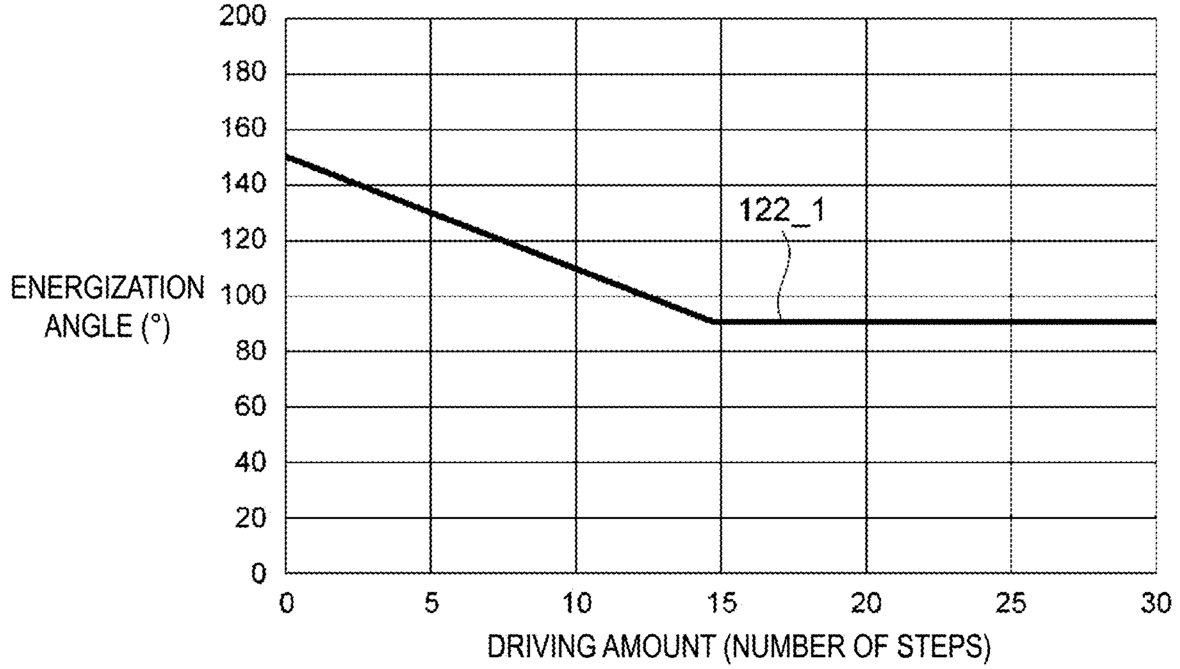
FIG. 5A is a diagram illustrating an example of an energization angle characteristic in the motor drive control device according to the first embodiment.
Figure 5B:
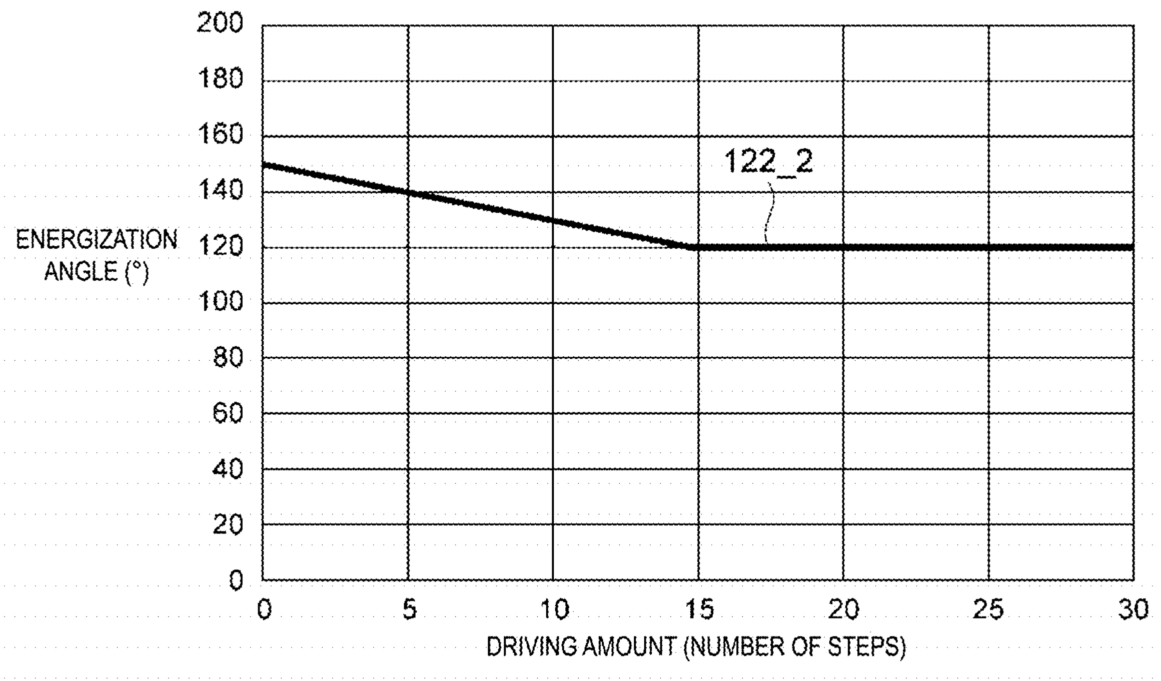
FIG. 5B is a diagram illustrating an example of an energization angle characteristic in the motor drive control device according to the first embodiment.

FIGS. 5A and 5B are diagrams illustrating an example of an energization angle characteristic in the motor drive control device 10 according to the first embodiment.

In FIGS. 5A and 5B, a horizontal axis represents the driving amount (the number of steps) of the two-phase stepping motor 20, and a vertical axis represents the energization angle θ [°]. FIG. 5A illustrates an energization angle characteristic 122_1 indicating the correspondence relationship between the driving amount and the energization angle of the two-phase stepping motor 20 when the two-phase stepping motor 20 is driven by the one-phase excitation system in the second commutation control mode. FIG. 5B illustrates an energization angle characteristic 122_2 indicating the correspondence relationship between the driving amount and the energization angle of the two-phase stepping motor 20 when the two-phase stepping motor 20 is driven by the one-two-phase excitation system in the second commutation control mode.

The energization angle characteristics 122_1 and 122_2 are set such that the energization angle is reduced to a predetermined value (energization angle in the second commutation control mode) as the driving amount (the number of steps) of the two-phase stepping motor 20 increases. In other words, in the first commutation control mode, the energization angle is reduced to a predetermined value over time.

When the two-phase stepping motor 20 is driven by the one-phase excitation system in the first commutation control mode, for example, immediately after the start of driving of the two-phase stepping motor 20 as illustrated in FIG. 5A, the control unit 11 sets the energization angle θ to 150° (initial value) and drives the two-phase stepping motor 20 by the one-two-phase excitation system. Subsequently, the control unit 11 gradually decreases the energization angle θ from 150° according to an increase in the driving amount (the number of steps). When the driving amount (the number of steps) reaches "15", the energization angle θ is fixed to 90°, and the two-phase stepping motor 20 is driven by the one-phase excitation system. When the detection result of the zero crossing point of the back electromotive voltage satisfies the predetermined condition, the control unit 11 switches the control mode from the first commutation control mode to the second commutation control mode, and performs energization switching of the coils 21A and 21B according to the detection result of the zero crossing point of the back electromotive voltage by the one-phase excitation system (energization angle θ=) 90°.

When the two-phase stepping motor 20 is driven by the one-two-phase excitation system in the first commutation control mode, for example, immediately after the start of driving of the two-phase stepping motor 20 as illustrated in FIG. 5B, the control unit 11 sets the energization angle θ to a relatively great value, for example, 150° (initial value), and drives the two-phase stepping motor 20 by the one-two-phase excitation system in order to avoid step-out. Subsequently, the control unit 11 gradually decreases the energization angle θ from 150° according to an increase in the driving amount (the number of steps). When the driving amount (the number of steps) reaches "15", the control unit 11 fixes the energization angle θ to 120° and drives the two-phase stepping motor 20 by the one-two-phase excitation system with the energization angle of 120°. Subsequently, when the detection result of the zero crossing point of the back electromotive voltage satisfies the predetermined condition, the control unit 11 switches from the first commutation control mode to the second commutation control mode, and performs energization switching of the coils 21A and 21B according to the detection result of the zero crossing point of the back electromotive voltage in the one-two-phase excitation system (energization angle θ=) 120°.

In the following description, when the energization angle characteristics 122_1 and 122_2 are not distinguished from each other, they may be referred to as an "energization angle characteristic 122".

In this way, in the motor drive control device 10 according to the present embodiment, the control unit 11 performs commutation control of the coils 21A and 21B of the two-phase stepping motor 20 by switching between the above-described two control modes. A specific functional block configuration of the control unit 11 for performing the commutation control will be described below.

Figure 6:
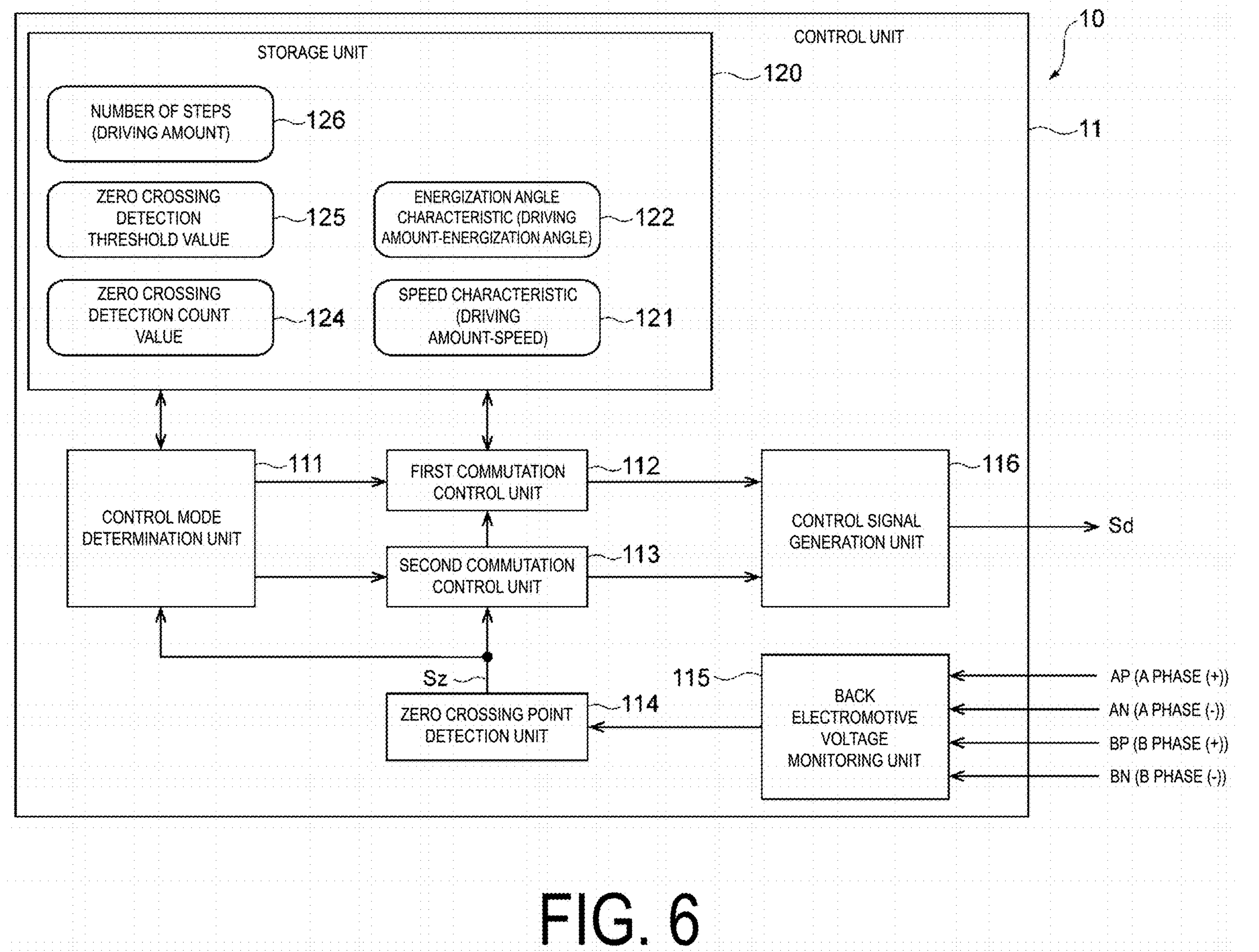
FIG. 6 is a diagram illustrating an example of a functional block configuration of a control unit in the motor drive control device according to the first embodiment.

FIG. 6 is a diagram illustrating an example of a functional block configuration of the control unit 11 in the motor drive control device 10 according to the first embodiment.

For convenience of description, FIG. 6 illustrates a configuration for implementing the function of the commutation control, and does not illustrate configurations related to other functions.

As illustrated in FIG. 6, the control unit 11 includes, for example, a control mode determination unit 111, a first commutation control unit 112, a second commutation control unit 113, a zero crossing point detection unit 114, a back electromotive voltage monitoring unit 115, a control signal generation unit 116, and a storage unit 120.

In a program processing device (the micro controller) serving as the control unit 11 described above, these functional units are achieved, for example, by a processor executing various types of arithmetic processes in accordance with a program stored in a storage device, and controlling peripheral circuits such as an A/D conversion circuit and a timer.

The back electromotive voltage monitoring unit 115 is a functional unit for monitoring a back electromotive voltage generated in the coils 21A and 21B of the respective phases.

The zero crossing point detection unit 114 is a functional unit for detecting a zero crossing point of the back electromotive voltage generated in the coils 21A and 21B of the two-phase stepping motor 20 based on a monitoring result from the back electromotive voltage monitoring unit 115. When detecting a zero crossing point of a back electromotive voltage of the non-excited coil 21, the zero crossing point detection unit 114 outputs a detection signal Sz indicating detection of the zero crossing point.

The storage unit 120 is a functional unit for storing various types of data necessary for performing energization switching control. The storage unit 120 stores, for example, information on the speed characteristic 121 and the energization angle characteristic 122 described above, and information on a threshold value (zero crossing detection threshold value) 125 related to the number of times of detection of the zero crossing point of the back electromotive voltage as the above predetermined condition. The storage unit 120 also stores information on the number of times of detection (zero crossing detection count value) 124 of the zero crossing point of the back electromotive voltage detected by the zero crossing point detection unit 114. The storage unit 120 further stores the driving amount of the two-phase stepping motor 20, that is, the number of steps 126.

Note that the energization angle characteristics 122_1 and 122_2 may be stored in the storage unit 120, or when the excitation system in the second commutation control mode is determined in advance, only the energization angle characteristic 122 corresponding to the excitation system may be stored in the storage unit 120.

The control signal generation unit 116 is a functional unit for generating the control signal Sd for controlling driving of the two-phase stepping motor 20. The control signal generation unit 116 generates the control signal Sd in accordance with instructions from the first commutation control unit 112 and the second commutation control unit 113 to be described below, and supplies the control signal Sd to the drive unit 12. The control signal Sd is, for example, a pulse width modulation (PWM) signal.

The control mode determination unit 111 is a functional unit for determining a control mode for controlling commutation of the coils 21A and 21B of the two-phase stepping motor 20. For example, when a driving instruction of the two-phase stepping motor 20 is received from a host device (not illustrated), the control mode determination unit 111 starts counting the number of steps (driving amount), stores the count value in the storage unit 120 as the number of steps 126, selects one of the first commutation control mode and the second commutation control mode, and instructs the first commutation control unit 112 or the second commutation control unit 113 to perform commutation control.

For example, when the driving of the two-phase stepping motor 20 is started in accordance with the driving instruction from the host device, the control mode determination unit 111 selects the first commutation control mode and instructs the first commutation control unit 112 to perform the commutation control. At the time, the second commutation control unit 113 stops the commutation control.

The control mode determination unit 111 monitors whether the zero crossing point of the back electromotive voltage of the coil 21 is detected by the zero crossing point detection unit 114 during the period of the first commutation control mode. The control mode determination unit 111 counts the number of times the zero crossing point of the back electromotive voltage of the coil 21 is detected during the period of the first commutation control mode, and stores the count value in the storage unit 120 as the zero crossing detection count value 124.

The control mode determination unit 111 compares the zero crossing detection count value 124 with the zero crossing detection threshold value 125 during the period of the first commutation control mode, switches the control mode from the first commutation control mode to the second commutation control mode when the zero crossing detection count value 124 is equal to or greater than the zero crossing detection threshold value 125, instructs the first commutation control unit 112 to stop the commutation control, and instructs the second commutation control unit 113 to perform the commutation control.

The first commutation control unit 112 is a functional unit for performing the commutation control of the coils 21A and 21B of the two-phase stepping motor 20 in the first commutation control mode. When the control mode determination unit 111 instructs the execution of the commutation control, the first commutation control unit 112 starts the commutation control in the first commutation control mode.

Specifically, first, the first commutation control unit 112 determines a speed corresponding to the number of steps 126 at that time based on the speed characteristic 121 stored in the storage unit 120. The first commutation control unit 112 determines the energization angle θ corresponding to the number of steps 126 at that time based on the energization angle characteristic 122 stored in the storage unit 120.

Subsequently, the first commutation control unit 112 calculates a target energization time for one-phase excitation and a target energization time for two-phase excitation based on the determined speed and energization angle θ, and outputs an energization switching instruction to the control signal generation unit 116 based on the calculated target energization times.

As illustrated in FIG. 4, when the energization angle θ is determined, an angle corresponding to the period of the one-phase excitation and an angle corresponding to the period of the two-phase excitation are determined. Accordingly, for example, by dividing the angle corresponding to the period of the one-phase excitation by the speed, the target energization time for the one-phase excitation can be obtained. Similarly, by dividing the angle corresponding to the period of the two-phase excitation by the speed, the target energization time for the two-phase excitation can be obtained.

For example, when the one-phase excitation is started, the first commutation control unit 112 calculates the target energization time for the one-phase excitation based on the speed and the energization angle θ determined according to the number of steps 126 at that time, by the above-described method, starts measuring the time, and instructs the control signal generation unit 116 to perform the one-phase excitation. When the measured time reaches the target energization time for the one-phase excitation, the first commutation control unit 112 calculates the target energization time for the two-phase excitation based on the speed and the energization angle θ determined according to the number of steps 126 at that time, starts measuring the time, and instructs the control signal generation unit 116 to perform the two-phase excitation. When the measured time reaches the target energization time for performing the two-phase excitation, the first commutation control unit 112 performs the above process for performing the one-phase excitation again.

In the way, the first commutation control unit 112 determines the speed (driving frequency) and the energization angle θ for each number of steps based on the speed characteristic 121 and the energization angle characteristic 122, calculates the target energization times for the one-phase excitation and the two-phase excitation based on the determined speed and energization angle θ, and controls the commutation of the coils 21A and 21B based on the calculated target energization times.

The second commutation control unit 113 is a functional unit for performing the commutation control of the coils 21A and 21B of the two-phase stepping motor 20 in the second commutation control mode. The second commutation control unit 113 starts the commutation control (commutation control based on the detection result of the zero crossing point of the back electromotive voltage) in the second commutation control mode when the control mode determination unit 111 instructs the execution of the commutation control.

For example, a case where the two-phase stepping motor 20 is driven by the one-two-phase excitation system in the second commutation control mode is considered.

When the one-phase excitation is started, the second commutation control unit 113 instructs the control signal generation unit 116 to perform the one-phase excitation and monitors whether the zero crossing point of the back electromotive voltage is detected by the zero crossing point detection unit 114. When the zero crossing point detection unit 114 detects the zero crossing point of the back electromotive voltage during the period of the one-phase excitation, the second commutation control unit 113 instructs the control signal generation unit 116 to perform the two-phase excitation.

In the period for performing the two-phase excitation, since both the A-phase coil 21A and the B-phase coil 21B are excited, the back electromotive voltage of any of the A-phase coil 21A and the B-phase coil 21B is not measurable. For example, the second commutation control unit 113 calculates a target energization time for performing the two-phase excitation based on an elapsed time per unit angle when the two-phase stepping motor 20 is excited (for example, a period of one-phase excitation) and the set energization angle θ (for example, 120° in the case of FIG. 5B), and instructs the control signal generation unit 116 to switch the excitation state of the two-phase stepping motor 20 from the two-phase excitation to the one-phase excitation when the target energization time elapses.

In this way, in the second commutation control mode, the second commutation control unit 113 controls the commutation of the coils 21A and 21B based on the detection result of the zero crossing point of the back electromotive voltage of the coil 21, and thus can switch the energization of the coil 21 at an appropriate speed according to the magnitude of the load on the two-phase stepping motor 20. Thus, even when the load on the two-phase stepping motor 20 varies, the two-phase stepping motor 20 can be more stably driven while avoiding step-out.

A processing flow of the commutation control of the two-phase stepping motor 20 by the motor drive control device 10 according to the first embodiment will be described below.

Figure 7:
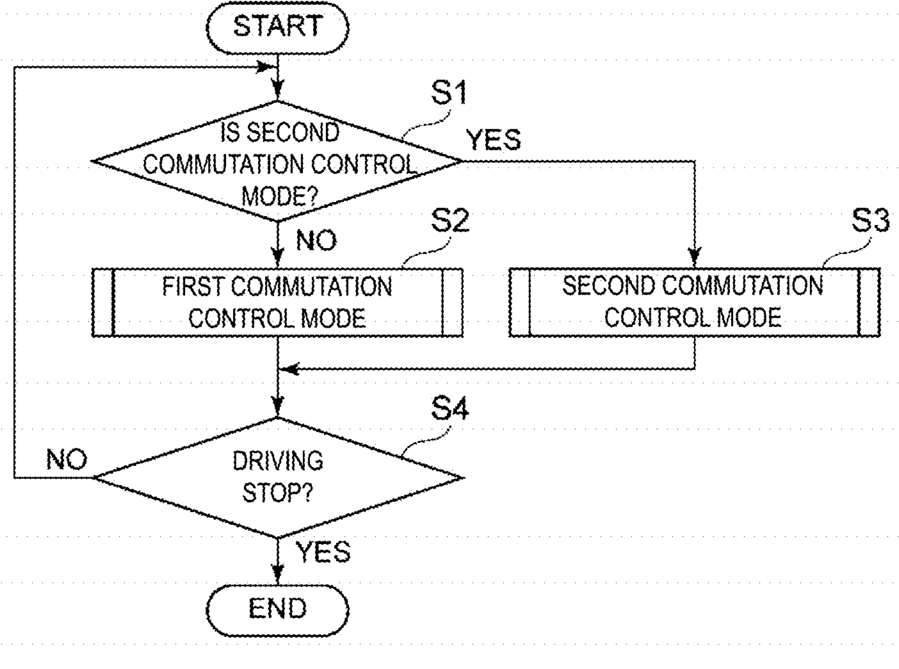
FIG. 7 is a flowchart illustrating the flow of commutation control according to the first embodiment.

FIG. 7 is a flowchart illustrating the flow of the commutation control according to the first embodiment.

In the following description, the first commutation control mode is assumed to be set as the initial setting of the control mode in the control unit 11, for example, after the motor drive control device 10 is powered on or after the driving of the two-phase stepping motor 20 is stopped.

For example, when the motor drive control device 10 receives an instruction to start driving the two-phase stepping motor 20 from the host device, the control unit 11 first starts counting the number of steps (driving amount), stores the count value in the storage unit 120 as the number of steps 126, and determines whether the control mode is the second commutation control mode (step S1).

For example, since the control mode is set to the first commutation control mode at the start of activation of the motor drive control device 10 (step S1: NO), the control unit 11 controls the driving of the two-phase stepping motor 20 in the first commutation control mode (step S2).

When the control mode is the second commutation control mode (step S1: YES), the control unit 11 controls the driving of the two-phase stepping motor 20 in the second commutation control mode (step S3).

After steps S2 and S3, the control unit 11 determines whether an instruction to stop the driving of the two-phase stepping motor 20 is received from, for example, the host device or the like (step S4). When the instruction to stop the driving is received (step S4: YES), the control unit 11 stops the two-phase stepping motor 20. On the other hand, when the instruction to stop the driving is not received (step S4: NO), the control unit 11 returns to step S1 again and continues the driving control of the two-phase stepping motor 20.

A flow of the processing (step S2) in the first commutation control mode will be described below.

Figure 8:
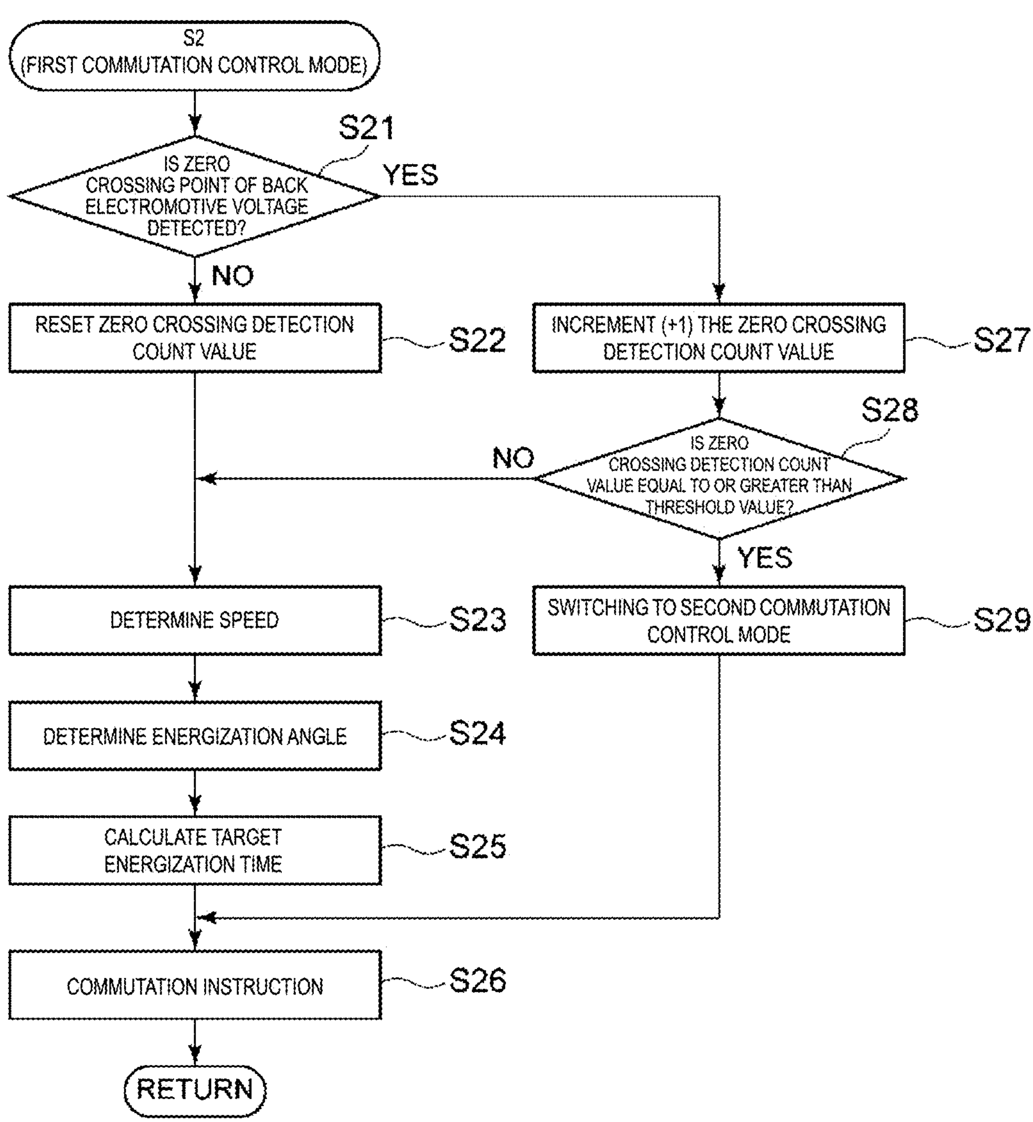
FIG. 8 is a diagram illustrating the flow of processing (step S2) in a first commutation control mode by the motor drive control device according to the first embodiment.

FIG. 8 is a diagram illustrating the flow of the processing (step S2) in the first commutation control mode by the motor drive control device 10 according to the first embodiment.

In the first commutation control mode, first, the control mode determination unit 111 of the control unit 11 determines whether the zero crossing point of the back electromotive voltage of the coil 21 is detected by the zero crossing point detection unit 114 (step S21). When the zero crossing point of the back electromotive voltage is not detected (step S21: NO), the control mode determination unit 111 resets the zero crossing detection count value 124 (step S22).

After step S22, the first commutation control unit 112 of the control unit 11 determines a speed (Step S23). Specifically, the first commutation control unit 112 determines, by the above-described method, the speed corresponding to the number of steps 126 at that time based on the speed characteristic 121.

The first commutation control unit 112 determines an energization angle θ (step S24). Specifically, the first commutation control unit 112 determines, by the above-described method, the energization angle θ corresponding to the number of steps 126 at that time based on the energization angle characteristic 122.

Subsequently, the first commutation control unit 112 calculates, by the above-described method, the target energization time for one-phase excitation or two-phase excitation to be performed next, based on the speed determined in step S23 and the energization angle θ determined in step S24 (step S25).

The first commutation control unit 112 instructs the control signal generation unit 116 to perform commutation, based on the target energization time determined in step S25 (step S26). Subsequently, the control unit 11 returns to the processing flow of FIG. 7 described above.

In step S21, when the zero crossing point of the back electromotive voltage is detected (step S21: YES), the control mode determination unit 111 increments the zero crossing detection count value 124 by 1 (step S27).

Subsequently, the control mode determination unit 111 determines whether the zero crossing detection count value 124 is equal to or greater than the zero crossing detection threshold value 125 (step S28). When the zero crossing detection count value 124 is less than the zero crossing detection threshold value 125 (step S28: NO), the control mode determination unit 111 proceeds to step S23, determines a speed and an energization angle θ corresponding to the number of steps 126 at that time, sets a target energization time for one-phase excitation or two-phase excitation to be performed next, and instructs the control signal generation unit 116 to perform commutation (steps S23 to S26).

On the other hand, when the zero crossing detection count value 124 is equal to or greater than the zero crossing detection threshold value 125 in step S28 (step S28: YES), the control mode determination unit 111 switches the control mode from the first commutation control mode to the second commutation control mode (step S29). Specifically, the control mode determination unit 111 instructs the first commutation control unit 112 to stop commutation control in the first commutation control mode and instructs the second commutation control unit 113 to perform commutation control in the second commutation control mode.

A flow of the processing (step S3) in the second commutation control mode will be described below.

Figure 9:
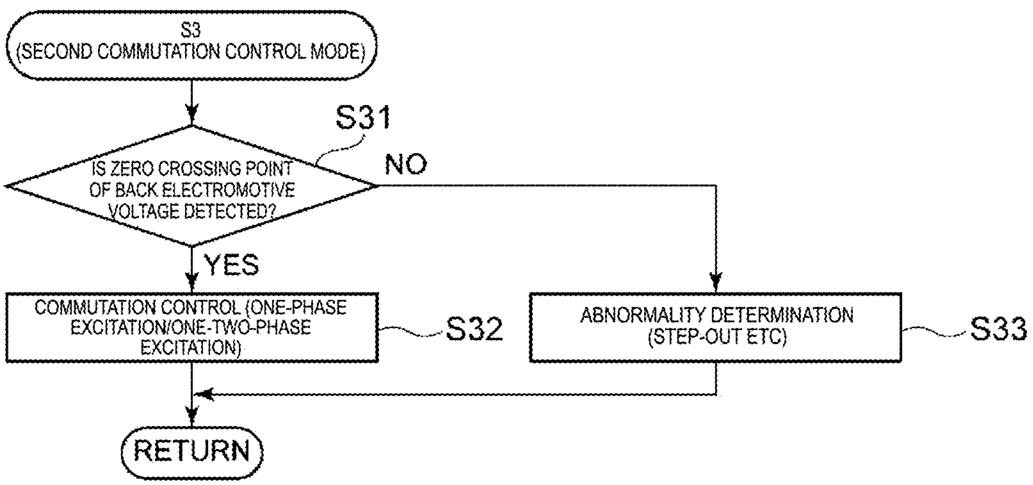
FIG. 9 is a diagram illustrating the flow of processing (step S3) in a second commutation control mode by the motor drive control device according to the first embodiment.

FIG. 9 is a diagram illustrating the flow of the processing (step S3) in the second commutation control mode by the motor drive control device 10 according to the first embodiment.

In the second commutation control mode, the second commutation control unit 113 determines whether the zero crossing point of the back electromotive voltage of the coil 21 is detected by the zero crossing point detection unit 114 (step S31). When the zero crossing point of the back electromotive voltage is detected (step S31: YES), the second commutation control unit 113 performs, by the above-described method, commutation control by one-two-phase excitation system (or one-phase excitation system) based on the detection result of the zero crossing point of the back electromotive voltage (step S32). Subsequently, the control unit 11 returns to the processing flow of FIG. 7 described above.

On the other hand, when the zero crossing point of the back electromotive voltage is not detected (step S31: NO), for example, since some abnormality such as step-out of the two-phase stepping motor 20 is highly likely to occur, the control unit 11 (for example, the control mode determination unit 111) determines occurrence of an abnormality, and for example, notifies the host device of the occurrence of the abnormality (step S33).

As described above, the motor drive control device 10 performs the commutation control of the two-phase stepping motor 20 according to the above-described processing procedure.

A change in speed (driving frequency) when the first commutation control mode is switched to the second commutation control mode will be described below.

Figure 10:
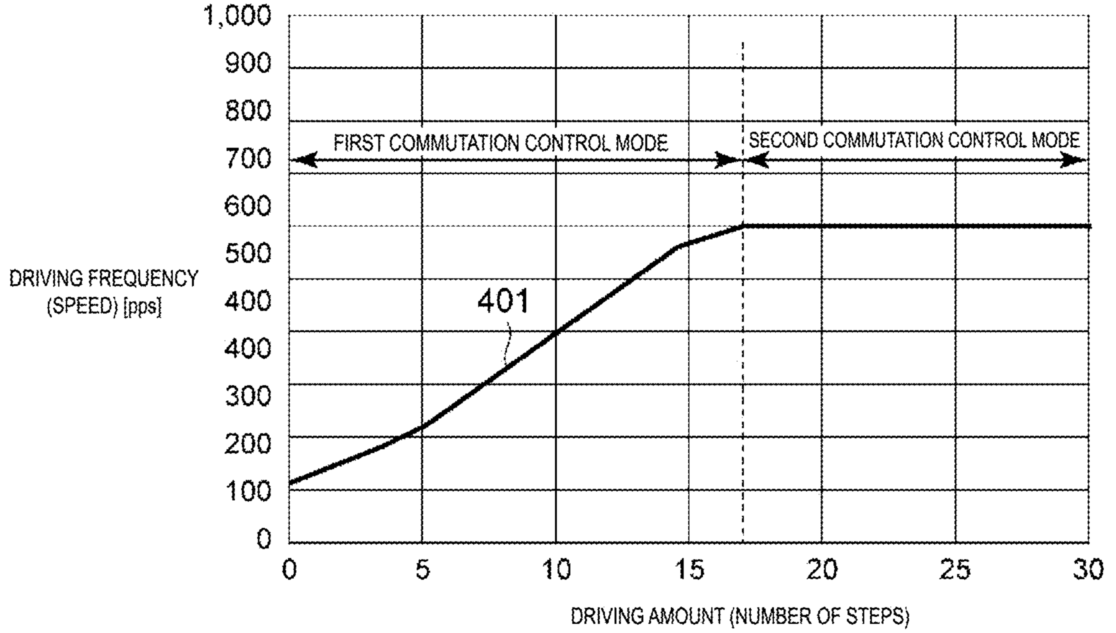
FIG. 10 is a diagram illustrating an example of a change in speed of a two-phase stepping motor after the start of driving.

FIG. 10 is a diagram illustrating an example of a change in speed after the start of driving of the two-phase stepping motor 20.

In FIG. 10, a horizontal axis represents the driving amount (the number of steps) of the two-phase stepping motor 20, and a vertical axis represents the driving frequencies [pps] as the speeds of the coils 21A and 21B. Reference numeral 401 represents a change in speed with respect to the driving amount (the number of steps) of the two-phase stepping motor after the start of driving of the two-phase stepping motor by the motor drive control device 10 when the magnitude of the load is 5.5 L [Ncm].

When the driving of the two-phase stepping motor 20 is started, the control unit 11 starts the commutation control of the two-phase stepping motor 20 in the first commutation control mode as described above, and increases the speed (driving frequency) according to an increase in the driving amount (the number of steps) of the two-phase stepping motor 20 as illustrated in FIG. 10. Subsequently, when the number of times of detection of the zero crossing point of the back electromotive voltage of the coil 21 is equal to or greater than the threshold value (the zero crossing detection count value 124 is equal to or greater than the zero crossing detection threshold value 125) during the period of the first commutation control mode, the control unit 11 switches the control mode from the first commutation control mode to the second commutation control mode, and starts commutation control based on the detection result of the zero crossing point of the back electromotive voltage. In the second commutation control mode, when the load on the two-phase stepping motor 20 is constant, the speed is constant.

Figure 11:
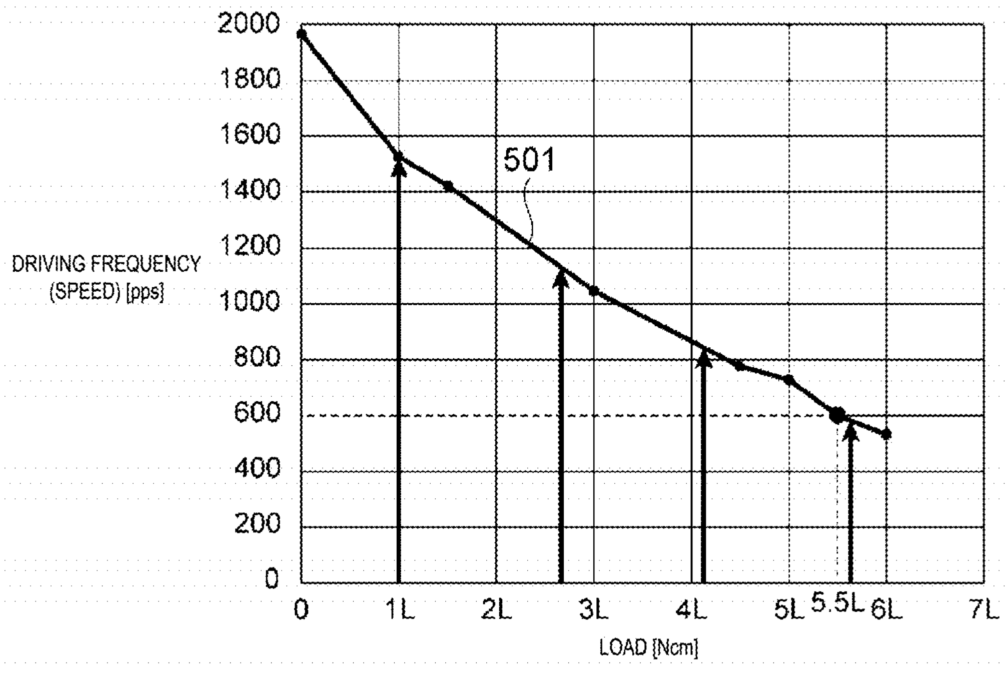
FIG. 11 is a diagram illustrating an example of a change in speed with respect to a load on the two-phase stepping motor.

FIG. 11 is a diagram illustrating an example of a change in speed with respect to the load on the two-phase stepping motor 20.

In FIG. 11, a horizontal axis represents the magnitude [Ncm] of the load on the two-phase stepping motor 20, and a vertical axis represents the driving frequency [pps] as the speeds of the coils 21A and 21B. Reference numeral 501 represents a change in speed with respect to a change in the load on the two-phase stepping motor 20 when the two-phase stepping motor 20 is driven by the one-two-phase excitation system in the second commutation control mode by the motor drive control device 10. In other words, reference numeral 501 represents the speed (driving frequency) the first commutation control mode is switched to the second commutation control mode with respect to the load.

As illustrated in FIG. 11, in the second commutation control mode, when the commutation control of the one-two-phase excitation system based on the detection result of the zero crossing point of the back electromotive voltage is performed by the above-described method, the timing the zero crossing point of the back electromotive voltage is detected during the period of the one-phase excitation changes according to the magnitude of the load. Specifically, as illustrated in FIG. 11, the speed (driving frequency) the first commutation control mode is switched to the second commutation control mode decreases as the load increases.

In this way, since the speed the first commutation control mode is switched to the second commutation control mode changes according to the load, the timing the first commutation control mode is switched to the second commutation control mode also changes according to the load.

For example, as illustrated in FIG. 11, when the magnitude of the load is 5.5 L [Ncm], the speed when the two-phase stepping motor 20 is driven by the one-two-phase excitation system in the second commutation control mode is 600 [pps]. Accordingly, as illustrated in FIG. 11, when the magnitude of the load is 5.5 L [Ncm], the control mode is switched to the second commutation control mode when the speed reaches 600 [pps] in the first commutation control mode, and when the magnitude of the load is constant at 5.5 L [Ncm], the speed is stabilized at 600 [pps].

As described above, the motor drive control device 10 according to the first embodiment performs commutation of the coils 21A and 21B in accordance with the target energization time based on the preset commutation condition in the first commutation control mode immediately after the start of activation of the two-phase stepping motor 20, and performs commutation of the coils 21A and 21B based on the detection result of the zero crossing point of the back electromotive voltage in the second commutation control mode when the detection result of the zero crossing point of the back electromotive voltage of the coil 21 satisfies the predetermined condition.

According to the configuration, since the target energization time is determined immediately after the start of activation of the two-phase stepping motor 20, when the back electromotive voltage is less or even when the zero crossing point of the back electromotive voltage is not detectable at an appropriate timing, the two-phase stepping motor 20 can be appropriately driven. Thus, even when the load on the two-phase stepping motor 20 is great, the occurrence of the step-out of the two-phase stepping motor 20 immediately after the activation of the two-phase stepping motor 20 can be suppressed.

In the motor drive control device 10, the speed of the two-phase stepping motor and the energization angle θ indicating the magnitude of an electrical angle for continuously energizing a coil of one phase of the two-phase coils in one direction are set as the commutation condition. In the first commutation control mode, the motor drive control device 10 determines the target energization time based on the speed and the energization angle θ.

According to the configuration, the target energization time in the first commutation control mode can be easily calculated.

When the number of times of detection of the zero crossing point of the back electromotive voltage is equal to or greater than the threshold value during the first commutation control mode, the motor drive control device 10 switches the control mode from the first commutation control mode to the second commutation control mode.

According to the configuration, since the control mode is switched from the first commutation control mode to the second commutation control mode when the zero crossing point of the back electromotive voltage can be stably detected, the occurrence of step-out immediately after the start of driving of the two-phase stepping motor 20 can be more reliably avoided, and the two-phase stepping motor 20 can be stably driven.

In the first commutation control mode, the speed increases over time.

According to the configuration, as described above, the two-phase stepping motor 20 is driven at a low speed immediately after the start of driving of the two-phase stepping motor 20 to suppress the occurrence of step-out, and the speed increases over time to allow the two-phase stepping motor 20 to quickly reach a target driving state.

In the first commutation control mode, the energization angle θ is reduced to a predetermined value over time.

According to the configuration, as described above, the two-phase stepping motor 20 is driven by setting the period of the two-phase excitation to be long immediately after the start of driving of the two-phase stepping motor 20 to suppress the occurrence of step-out, and the period of the two-phase excitation becomes short and the period of the one-phase excitation becomes long over time to allow the two-phase stepping motor 20 to quickly reach a target driving state.

The control unit 11 of the motor drive control device 10 stores information on the speed characteristic 121 indicating the correspondence relationship between the driving amount and the speed of the two-phase stepping motor 20, and the control unit 11 determines the speed corresponding to the driving amount based on the speed characteristic 121 in the first commutation control mode.

According to the configuration, the speed is easily changed over time immediately after the start of driving the two-phase stepping motor 20.

As illustrated in FIG. 3, the speed characteristic 121 includes the first section A where the speed changes at a constant rate, the second section B subsequent to the first section A where the speed changes at a higher rate than the first section A, and the third section C subsequent to the second section B where the speed changes at a lower rate than the second section B.

According to the configuration, the occurrence of step-out immediately after the start of driving of the two-phase stepping motor 20 can be more reliably avoided, and the two-phase stepping motor 20 can more quickly reach a target driving state.

As described above, the motor drive control device 10 according to the first embodiment can increase the stability of an operation at the time of driving of the two-phase stepping motor 20.

Second Embodiment

Figure 12:
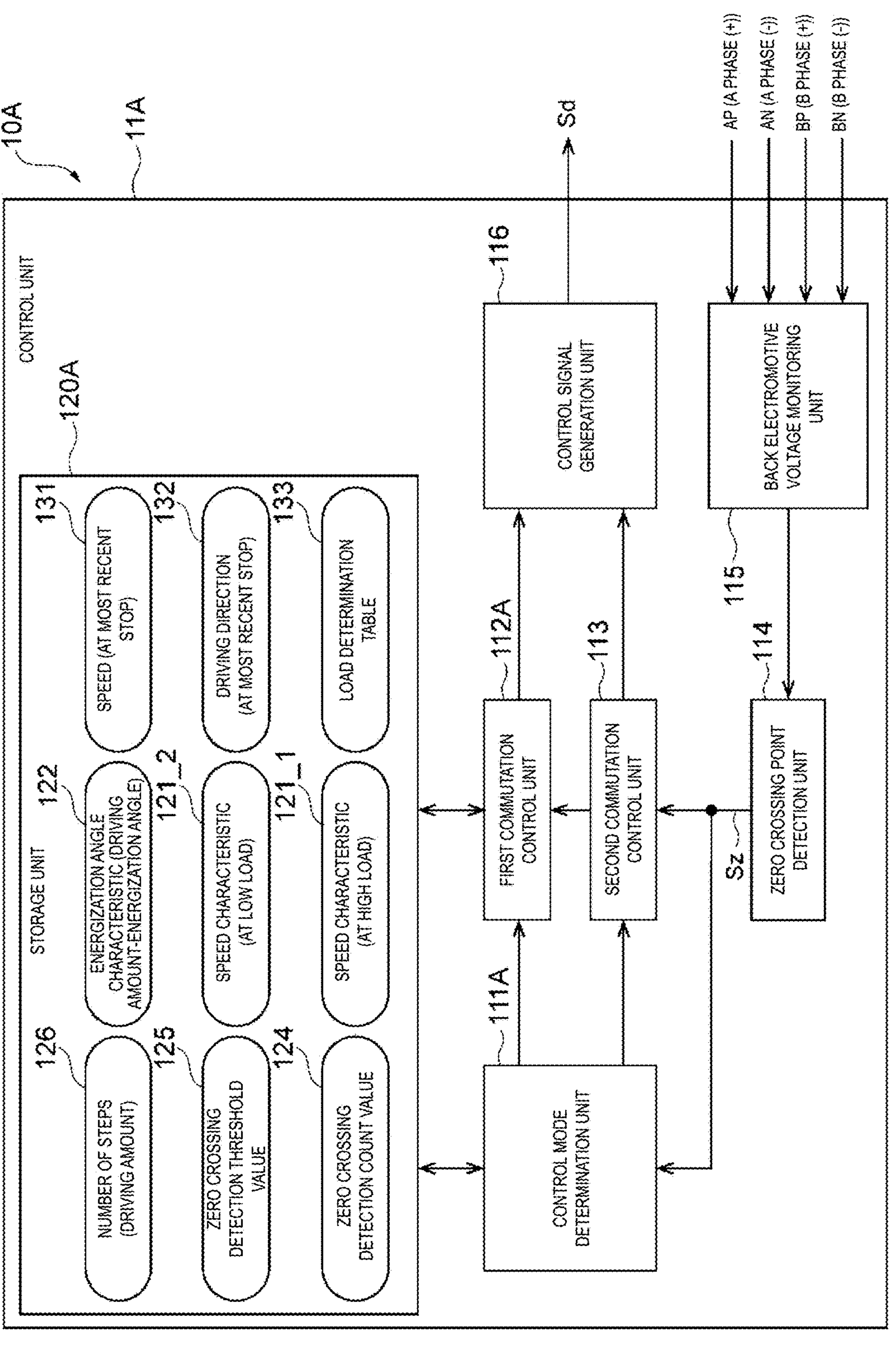
FIG. 12 is a diagram illustrating an example of a functional block configuration of a control unit in a motor drive control device according to a second embodiment.

FIG. 12 is a diagram illustrating an example of a functional block configuration of a control unit 11A in a motor drive control device 10A according to a second embodiment.

The motor drive control device 10A according to the second embodiment is different from the motor drive control device 10 according to the first embodiment in switching a speed characteristic to be used at the start of driving based on the magnitude of a load when the driving of the two-phase stepping motor 20 has been stopped most recently, and is the same as the motor drive control device 10 according to the first embodiment in the other points.

Specifically, when starting the commutation control of the two-phase stepping motor 20 in the first commutation control mode, the control unit 11A determines the rate of change in speed based on the magnitude of the load on the two-phase stepping motor 20 when the driving of the two-phase stepping motor 20 has been stopped most recently.

More specifically, in the first commutation control mode, a control mode determination unit 111A of the control unit 11A selects a speed characteristic 121 with the rate of change less in speed as the load on the two-phase stepping motor 20 when the driving of the two-phase stepping motor 20 has been stopped most recently is greater, and determines the speed based on the selected speed characteristic 121.

Figure 13:
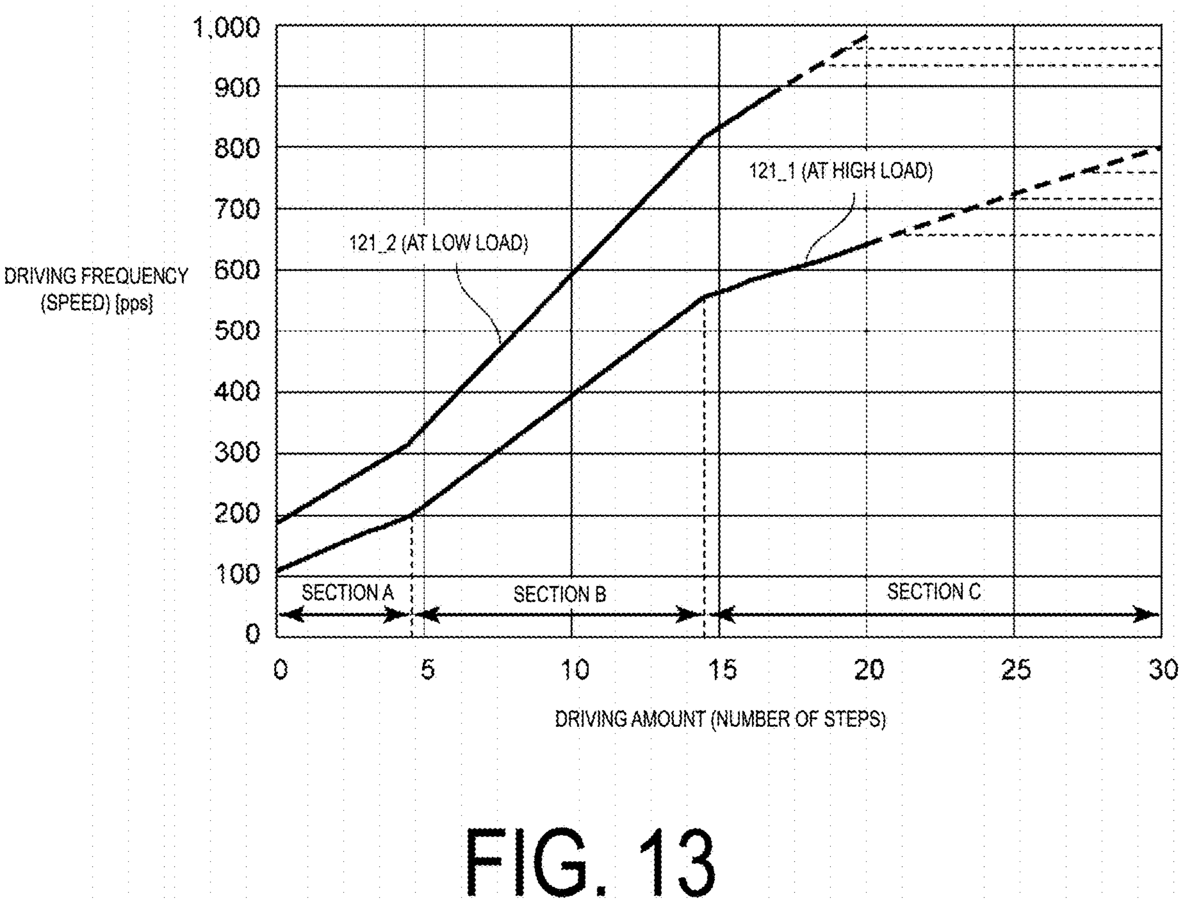
FIG. 13 is a diagram illustrating an example of a speed characteristic in the motor drive control device according to the second embodiment.

FIG. 13 is a diagram illustrating an example of speed characteristics 121_1 and 121_2 in the motor drive control device 10A according to the second embodiment.

In FIG. 13, a horizontal axis represents the driving amount (the number of steps) of the two-phase stepping motor 20, and a vertical axis represents the driving frequency [pps] as the speeds of the coils 21A and 21B.

The control unit 11A stores information on a plurality of speed characteristics 121 indicating the relationship between the driving amount (the number of steps) and the speed of the two-phase stepping motor 20 corresponding to the magnitude of the load on the two-phase stepping motor 20.

For example, as illustrated in FIGS. 12 and 13, the speed characteristic 121_1 corresponding to a high load and the speed characteristic 121_2 corresponding to a low load are stored in a storage unit 120A.

As illustrated in FIG. 13, the two speed characteristics 121_1 and 121_2 are different from each other in the rate of change in speed. For example, the speed characteristic 121_2 corresponding to the low load changes at a higher speed than the speed characteristic 121_1 corresponding to the high load, and the control mode can be more quickly switched from the first commutation control mode to the second commutation control mode.

In the following description, when the speed characteristic 121_1 and the speed characteristic 121_2 are not distinguished from each other, they are referred to as a speed characteristic 121.

When starting the commutation control in the first commutation control mode, a first commutation control unit 112A of the control unit 11A determines the magnitude of the load on the two-phase stepping motor 20 when the driving of the two-phase stepping motor 20 has been stopped most recently.

As illustrated in FIG. 11, a correlation exists between the magnitude of the load and the speed (driving frequency) when the two-phase stepping motor 20 is driven in the second commutation control mode.

In this regard, for example, the control mode determination unit 11A of the control unit 111A stores the value of the speed when the two-phase stepping motor 20 is driven in the storage unit 120A as speed information 131, and regularly updates the speed information 131.

When a target object to be driven by the two-phase stepping motor 20 is a rotary system, a torque for driving the load changes depending on the rotation direction (driving direction) of an output shaft of the two-phase stepping motor 20. In this regard, for example, the control mode determination unit 111A stores the rotation direction of the two-phase stepping motor 20 in the storage unit 120A as driving direction information 132, and regularly updates the driving direction information 132.

The speed information 131 and the driving direction information 132 may be, for example, information on the rotation speed and the rotation direction of the output shaft of the two-phase stepping motor 20. For example, when a detection device such as an encoder is provided at the output shaft of the two-phase stepping motor 20, the control mode determination unit 111A of the control unit 11A may acquire information on the rotation speed of the output shaft detected by the detection device and information on the rotation direction of the output shaft, and store the acquired information in the storage unit 120A as the speed information 131 and the driving direction information 132, respectively.

The speed information 131 and the driving direction information 132 are sequentially updated during the driving of the two-phase stepping motor 20, and the latest values are stored in the storage unit 120A. For example, when the control unit 11A stops the driving of the two-phase stepping motor 20 in response to an instruction from the host device or the like, information on a speed and a driving direction most recently the driving of the two-phase stepping motor 20 is stopped is stored in the storage unit 120A.

Note that the speed information 131 and the driving direction information 132 may be erased when the supply of power to the motor drive control device 10A (the control unit 11A) is stopped, or the speed information 131 and the driving direction information 132 may be stored in a non-volatile memory and may not be erased regardless of whether power is supplied.

When the driving of the two-phase stepping motor 20 is started in the first commutation control mode, the first commutation control unit 112A determines the magnitude of the load on the two-phase stepping motor 20 when the driving of the two-phase stepping motor 20 has been stopped most recently, based on at least one of the speed information 131 or the driving direction information 132 stored in the storage unit 120A.

For example, the first commutation control unit 112A determines the magnitude of the load by using a load determination table 133 being information indicating a correspondence relationship between at least one of the speed or the driving direction and the magnitude of the load, the load determination table 133 being stored in advance in the storage unit 120A.

FIGS. 14A to 14C are diagrams illustrating an example of a load determination table.

FIG. 14A illustrates a load determination table 133 indicating the correspondence relationship between the speed and the magnitude of the load. FIGS. 14B and 14C illustrate a load determination table 133 indicating the correspondence relationship between the speed/the driving direction and the magnitude of the load.

For example, when the magnitude of the load on the two-phase stepping motor 20 is determined using only the speed information 131, the first commutation control unit 112A determines whether a speed R stored in the storage unit 120A is greater than a threshold value Rth based on the load determination table 133 illustrated in FIG. 14A. When the speed R is less than the threshold value Rth ($R<Rth$), the load on the two-phase stepping motor 20 is determined to be a "high load", and the speed characteristic 121_1 corresponding to the "high load" is selected. On the other hand, when the speed R is equal to or greater than the threshold value Rth ($R\geq Rth$), the load on the two-phase stepping motor 20 is determined to be a "low load", and the speed characteristic 121_2 corresponding to the "low load" is selected.

When it is known in advance that the target object to be driven is a rotary system, the first commutation control unit 112A determines the magnitude of the load on the two-phase stepping motor 20 by using the speed information 131 and the driving direction information 132 based on the load determination table 133 illustrated in FIG. 14B.

Specifically, when the speed R is less than the threshold value Rth ($R<Rth$) and the driving direction at the start of driving of the two-phase stepping motor 20 coincides with the driving direction at the most recent stop stored in the storage unit 120A (the driving direction at the start of driving is the same as the driving direction at the most recent stop), the first commutation control unit 112A determines the load on the two-phase stepping motor 20 as a "high load" and selects the speed characteristic 121_1 corresponding to the "high load".

On the other hand, when the speed R is equal to or greater than the threshold value Rth ($R\geq Rth$) and the driving direction at the start of driving of the two-phase stepping motor 20 coincides with the driving direction at the most recent stop stored in the storage unit 120A (the driving direction at the start of driving is the same as the driving direction at the most recent stop), the first commutation control unit 112A determines the load on the two-phase stepping motor 20 as a "low load" and selects the speed characteristic 121_2 corresponding to the "low load".

When the speed R is less than the threshold value Rth (R<Rth) and the driving direction at the start of driving of the two-phase stepping motor 20 does not coincide with the driving direction at the most recent stop stored in the storage unit 120A (the driving direction at the start of driving is opposite to the driving direction at the most recent stop), the first commutation control unit 112A determines the load on the two-phase stepping motor 20 as a "low load" and selects the speed characteristic 121_2 corresponding to the "low load".

On the other hand, when the speed R is equal to or greater than the threshold value Rth (R≥Rth) and the driving direction at the start of driving of the two-phase stepping motor 20 does not coincide with the driving direction at the most recent stop stored in the storage unit 120A (the driving direction at the start of driving is opposite to the driving direction at the most recent stop), the first commutation control unit 112A determines the load on the two-phase stepping motor 20 as a "high load" and selects the speed characteristic 121_1 corresponding to the "high load".

When it is unclear whether the target object to be driven is a rotary system, the first commutation control unit 112A determines the magnitude of the load on the two-phase stepping motor 20 by using the speed information 131 and the driving direction information 132 based on the load determination table 133 illustrated in FIG. 14C.

Specifically, when the speed R is less than the threshold value Rth (R<Rth) and the driving direction at the start of driving of the two-phase stepping motor 20 coincides with the driving direction at the most recent stop stored in the storage unit 120A (the driving direction at the start of driving is the same as the driving direction at the most recent stop), the first commutation control unit 112A determines the load on the two-phase stepping motor 20 as a "high load" and selects the speed characteristic 121_1 corresponding to the "high load".

When the speed R is equal to or greater than the threshold value Rth (R≥Rth) and the driving direction at the start of driving of the two-phase stepping motor 20 coincides with the driving direction at the most recent stop stored in the storage unit 120A (the driving direction at the start of driving is the same as the driving direction at the most recent stop), the first commutation control unit 112A determines the load on the two-phase stepping motor 20 as a "low load" and selects the speed characteristic 121_2 corresponding to the "low load".

On the other hand, when the driving direction at the start of driving of the two-phase stepping motor 20 does not coincide with the driving direction at the most recent stop stored in the storage unit 120A (the driving direction at the start of driving is opposite to the driving direction at the most recent stop), the first commutation control unit 112A determines the load on the two-phase stepping motor 20 as "unknown" regardless of the speed (magnitude of the speed R and the threshold value Rth). In this case, the first commutation control unit 112A selects the speed characteristic 121_1 corresponding to the "high load". In this way, when the load on the two-phase stepping motor 20 is determined to be "unknown", since the speed characteristic 121_1 corresponding to "high load" is selected, even though an actual load on the two-phase stepping motor 20 is either a "high load" or a "low load", the occurrence of step-out immediately after the start of driving of the two-phase stepping motor 20 can be avoided and the two-phase stepping motor 20 can be stably driven by reducing the rate of change in speed.

Although an example of the load determination method has been described above with reference to FIGS. 14A, 14B, and 14C, a method other than the above may be used for load determination depending on a control target.

A processing flow in the first commutation control mode by the motor drive control device 10A according to the second embodiment will be described below.

Figure 15:
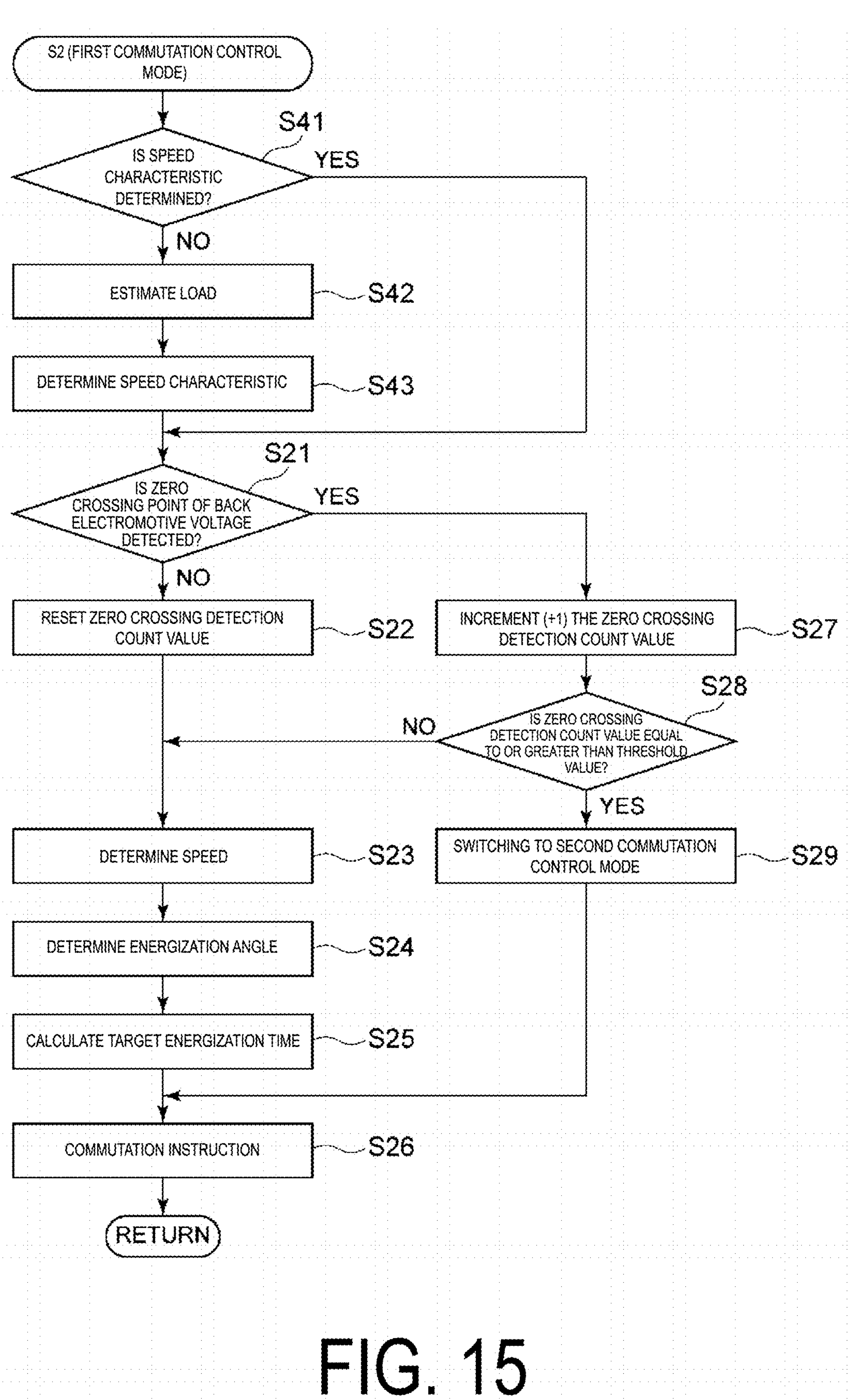
FIG. 15 is a diagram illustrating a processing flow in a first commutation control mode by the motor drive control device according to the second embodiment.

FIG. 15 is a diagram illustrating a processing flow in the first commutation control mode by the motor drive control device 10A according to the second embodiment.

The motor drive control device 10A according to the second embodiment performs the commutation control according to the flowchart illustrated in FIG. 7 like the motor drive control device 10 according to the first embodiment, and performs a process illustrated in FIG. 15 in step S2 of the flowchart illustrated in FIG. 7.

When starting the driving of the two-phase stepping motor 20, the control mode determination unit 111A sets the control mode to the first commutation control mode like the motor drive control device 10 according to the first embodiment.

In the first commutation control mode, first, the first commutation control unit 112A determines whether the speed characteristic 121 corresponding to a load is determined (step S41). When the speed characteristic corresponding to the load has already been determined (step S41: YES), the first commutation control unit 112A proceeds to step S21 and performs commutation control in accordance with the same procedure as the processing flow (FIG. 8) according to the first embodiment (steps S21 to S29).

On the other hand, for example, when the speed characteristic corresponding to the load is not determined (step S41: NO) such as immediately after the start of activation, the first commutation control unit 112A estimates the magnitude of the load on the two-phase stepping motor 20 (step S42). Specifically, the first commutation control unit 112A estimates the magnitude of the load on the two-phase stepping motor 20 by the above-described method based on at least one of the speed information 131 or the driving direction information 132 stored in the storage unit 120A and the load determination table 133.

Subsequently, the first commutation control unit 112A selects one of the speed characteristics 121_1 and 121_2 based on the magnitude of the load estimated in step S42 (step S43).

Subsequently, the first commutation control unit 112A uses the speed characteristic 121 selected in step S43 to perform the commutation control in accordance with the same procedure as the processing flow (FIG. 8) according to the first embodiment (steps S21 to S29).

As described above, when starting the commutation control of the two-phase stepping motor 20 in the first commutation control mode, the motor drive control device 10A according to the second embodiment determines the rate of change in speed based on the magnitude of the load on the two-phase stepping motor 20 when the driving of the two-phase stepping motor 20 has been stopped most recently. Specifically, the motor drive control device 10A stores a plurality of speed characteristics 121_1 and 121_2 having different rates of change in speed in the storage unit 120A, selects the speed characteristic 121 having a lower rate of change in speed as the load when the driving of the two-phase stepping motor 20 has been stopped most recently is greater, and performs the commutation control in the first commutation control mode.

According to the configuration, the two-phase stepping motor 20 can be driven at an appropriate speed according to the load on the two-phase stepping motor 20. That is, when the load on the two-phase stepping motor 20 is a "high load", the commutation control is performed using the speed characteristic 121_1 with a gentle change in the speed, so that the occurrence of the step-out at the time of the high load can be avoided and the two-phase stepping motor 20 can be more stably driven. On the other hand, when the load on the two-phase stepping motor 20 is a "low load", since the step-out is less likely to occur as compared to a case where the load is a "high load", the commutation control is performed using the speed characteristic 121_2 with a quick change in the speed, thereby causing the two-phase stepping motor 20 to quickly reach a target driving state.

The motor drive control device 10A according to the second embodiment estimates the magnitude of the load on the two-phase stepping motor 20 based on information on at least one of the speed or the driving direction of the two-phase stepping motor 20 when the driving of the two-phase stepping motor 20 has been stopped most recently.

According to the configuration, the magnitude of the load on the two-phase stepping motor 20 can be accurately and easily estimated.

Expansion of Embodiments

The invention made by the present inventors is specifically described above based on the embodiments, but the present invention is not limited to the embodiments, and it goes without saying that the present invention can be changed in various ways within the scope not departing from the gist of the present invention.

For example, in the above embodiments, the case where the two-phase stepping motor 20 is driven by the one-two-phase excitation system in the first commutation control mode and the second commutation control mode has been described; however, no such limitation is intended. For example, in the first commutation control mode, the two-phase stepping motor 20 may be driven by the one-two-phase excitation system, and in the second commutation control mode, the two-phase stepping motor 20 may be driven by the one-phase excitation system.

Although FIGS. 5A and 5B illustrate the case where an initial value of the energization angle θ in the energization angle characteristics 122_1 and 122_2 is set to 150°, the initial value of the energization angle can be arbitrarily set in the range of $90° < \theta \leq 180°$.

For example, when it is desired to more reliably avoid step-out, the initial value of the energization angle θ may be set to 180°, the driving of the two-phase stepping motor 20 may be started by the two-phase excitation system, and then the excitation system may be switched to the one-two-phase excitation system by decreasing the energization angle θ. When it is desired to shift the two-phase stepping motor 20 to a target driving state more quickly after the start of driving of the two-phase stepping motor 20, the initial value of the energization angle θ may be set to 120°, for example, and the energization angle θ may be decreased from 120°. Alternatively, the energization angle θ may be set to a fixed value (same value as in the second commutation control mode), and only the speed may be changed.

In the two-phase stepping motor 20, the case where the number of poles of the rotor 22 is two has been described; however, the number of poles of the rotor 22 is not particularly limited.

The motor unit 1 is not limited to the configuration disclosed in FIG. 1. For example, the drive unit 12 may include other circuits such as a current detection circuit for detecting the coil currents of the coils 21A and 21B, in addition to the motor drive unit 13 described above.

In addition, the flowcharts described above are examples for the purpose of explaining operations, and the embodiments are not limited to the flowcharts. That is, the steps illustrated in each drawing of the flowcharts are specific examples, and the embodiments are not limited to the flowcharts. For example, the order of some processing operations may be partially changed, another processing may be inserted between individual processing operations, or some processing operations may be performed in parallel.

REFERENCE SIGNS LIST

1 Motor unit, 10, 10A Motor drive control device, 11, 11A Control unit, 12 Drive unit, 13 Motor drive unit, 20 Two-phase stepping motor, 21, 21A, 21B Coil, 22 Rotor, 111, 111A Control mode determination unit, 112, 112A First commutation control unit, 113 Second commutation control unit, 114 Zero crossing point detection unit, 115 Back electromotive voltage monitoring unit, 116 Control signal generation unit, 120, 120A Storage unit, 121, 121_1, 121_2 Speed characteristic, 122, 122_1, 122_2 Energization angle characteristic, 124 Zero crossing detection count value, 125 Zero crossing detection threshold value, 126 Number of steps, 131 Speed information, 132 Driving direction information, 133 Load determination table, 401 Change in speed with respect to driving amount, 501 Change in speed with respect to change in load, Sd Control signal, Sz Detection signal, θ Energization angle

The invention claimed is:

1. A motor drive control device comprising:

a control unit configured to generate a control signal for controlling driving of a two-phase stepping motor; and a drive unit configured to drive coils of two phases of the two-phase stepping motor based on the control signal, wherein the control unit has, as control modes, a first commutation control mode for commutating the coils according to a target energization time based on a preset commutation condition, and a second commutation control mode for commutating the coils based on a detection result of a zero crossing point of a back electromotive voltage of the coils, and the control unit generates the control signal in the first commutation control mode at start of activation of the two-phase stepping motor, and generates the control signal in the second commutation control mode when the detection result of the zero crossing point satisfies a predetermined condition, wherein a speed of the two phase stepping motor and an energization angle indicating a magnitude of an electrical angle for energizing one of the coils of the two phases continuously in one direction are set as the commutation condition, and in the first commutation control mode, the control unit determines the target energization time based on the speed and the energization angle.

2. The motor drive control device according to claim 1, wherein in the first commutation control mode, the speed increases over time.

3. The motor drive control device according to claim 1, wherein in the first commutation control mode, the energization angle is reduced to a predetermined value over time.

4. The motor drive control device according to claim 1, wherein the control unit stores information on a speed characteristic indicating a correspondence relationship between a driving amount and the speed of the two-phase stepping motor, and in the first commutation control mode, the control unit determines the speed corresponding to the driving amount based on the speed characteristic.

5. The motor drive control device according to claim 1, wherein in a case where starting commutation control of the two-phase stepping motor in the first commutation control mode, the control unit determines a rate of change in the speed based on a magnitude of a load on the two-phase stepping motor when driving of the two-phase stepping motor is stopped most recently.

6. The motor drive control device according to claim 5, wherein the control unit stores information on a plurality of speed characteristics indicating a relationship between a driving amount and the speed of the two-phase stepping motor corresponding to the magnitude of the load on the two-phase stepping motor, the plurality of speed characteristics are different from each other in the rate of change in the speed, and in the first commutation control mode, the control unit selects the speed characteristic with the rate of change less in the speed as the load on the two-phase stepping motor when the driving of the two-phase stepping motor is stopped most recently is greater, and determines the speed based on the selected speed characteristic.

7. The motor drive control device according to claim 5, wherein the control unit estimates the magnitude of the load based on information on at least one of the speed or a driving direction of the two-phase stepping motor when the driving of the two-phase stepping motor is stopped most recently.

8. The motor drive control device according to claim 4, wherein the speed characteristic includes a first section where the speed changes at a constant rate, a second section subsequent to the first section where the speed changes at a higher rate than the first section, and a third section where the speed changes at a lower rate than the second section subsequent to the second section.

9. The motor drive control device according to claim 1, wherein the predetermined condition includes a threshold value related to the number of times of detection of the zero crossing point, and when the number of times of detection of the zero crossing point is equal to or greater than the threshold value, the control unit switches the control mode from the first commutation control mode to the second commutation control mode.

10. A motor unit comprising:

the motor drive control device according to claim 1; and the two-phase stepping motor.

11. A motor drive control method for controlling driving of a two-phase stepping motor, the motor drive control method comprising the steps of:

commutating coils of two phases of the two-phase stepping motor according to a target energization time based on a preset commutation condition at start of activation of the two-phase stepping motor, wherein a speed of the two phase stepping motor and an energization angle indicating a magnitude of an electrical angle for energizing one of the coils of the two phases continuously in one direction are set as the commutation condition, and the target energization time based on the speed and the energization angle;

determining whether a detection result of a zero crossing point of a back electromotive voltage of the coils satisfies a predetermined condition; and commutating the coils based on the detection result of the zero crossing point when the detection result of the zero crossing point satisfies the predetermined condition.

* * * * *